(12) United States Patent
Lee et al.

(10) Patent No.: US 11,508,362 B2
(45) Date of Patent: Nov. 22, 2022

(54) VOICE RECOGNITION METHOD OF ARTIFICIAL INTELLIGENCE ROBOT DEVICE

(71) Applicant: LG ELECTRONICS INC., Seoul (KR)

(72) Inventors: Inho Lee, Seoul (KR); Junmin Lee, Seoul (KR); Keunsang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 17/025,459

(22) Filed: Sep. 18, 2020

(65) Prior Publication Data

US 2021/0151043 A1    May 20, 2021

(30) Foreign Application Priority Data

Nov. 19, 2019   (KR) .......................... 10-2019-0148936

(51) Int. Cl.
*G10L 15/20*     (2006.01)
*G10L 21/0232*   (2013.01)
(Continued)

(52) U.S. Cl.
CPC ................ *G10L 15/20* (2013.01); *G06N 3/04* (2013.01); *G06N 3/08* (2013.01); *G10L 15/02* (2013.01);
(Continued)

(58) Field of Classification Search
CPC ......... G10L 15/20; G10L 15/02; G10L 15/22; G10L 21/0232; G10L 15/16; G10L 25/84;
(Continued)

(56) References Cited

U.S. PATENT DOCUMENTS

2016/0005394 A1\*  1/2016  Hiroe .................. G10L 21/0272
                                                        704/248
2016/0284349 A1\*  9/2016  Ravindran ............ G10L 15/285
(Continued)

*Primary Examiner* — Mohammad K Islam
(74) *Attorney, Agent, or Firm* — Lee, Hong, Degerman, Kang & Waimey PC

(57) ABSTRACT

A voice recognition method of an artificial intelligence robot device is disclosed. The voice recognition method includes collecting a first voice spoken by a user and determining whether a wake-up word of the artificial intelligence robot device is recognized based on the collected first voice; if the wake-up word is not recognized, sensing a location of the user using at least one sensor and determining whether the sensed location of the user is included in a set voice collection range; if the location of the user is included in the voice collection range, learning the first voice and determining a noise state of the first voice based on the learned first voice; collecting a second voice in an opposite direction of the location of the user according to a result of the determined noise state of the first voice; and extracting a feature value of a noise based on the second voice and removing the extracted feature value of the noise from the first voice to obtain the wake-up word. The artificial intelligence robot device may be associated with an artificial intelligence module, an unmanned aerial vehicle (UAV), a robot, an augmented reality (AR) device, a virtual reality (VR) device, devices related to 5G services, and the like.

19 Claims, 22 Drawing Sheets

(51) Int. Cl.
  *G10L 25/84* (2013.01)
  *G10L 15/22* (2006.01)
  *G10L 15/16* (2006.01)
  *H04W 72/12* (2009.01)
  *H04L 5/00* (2006.01)
  *G06N 3/04* (2006.01)
  *G06N 3/08* (2006.01)
  *G10L 15/02* (2006.01)
  *G10L 15/08* (2006.01)

(52) U.S. Cl.
  CPC ............. *G10L 15/16* (2013.01); *G10L 15/22* (2013.01); *G10L 21/0232* (2013.01); *G10L 25/84* (2013.01); *H04L 5/0048* (2013.01); *H04W 72/1289* (2013.01); *G10L 2015/088* (2013.01); *G10L 2015/223* (2013.01)

(58) Field of Classification Search
  CPC ........ G10L 2015/088; G10L 2015/223; G06N 3/08; G06N 3/04; H04L 5/0048; H04W 72/1289
  See application file for complete search history.

(56) References Cited

U.S. PATENT DOCUMENTS

| | | | | |
|---|---|---|---|---|
| 2017/0092284 A1* | 3/2017 | Nakamura | ............ | G10L 21/003 |
| 2017/0280235 A1* | 9/2017 | Varerkar | ................... | H04R 3/04 |
| 2019/0080689 A1* | 3/2019 | Kagoshima | ............... | G01S 5/18 |
| 2019/0385635 A1* | 12/2019 | Shahen Tov | ............ | G10L 25/21 |
| 2020/0088856 A1* | 3/2020 | Ida | ........................... | G01S 7/487 |
| 2021/0327447 A1* | 10/2021 | Maeng | ................... | G06V 20/20 |

\* cited by examiner

VOICE RECOGNITION METHOD OF ARTIFICIAL INTELLIGENCE ROBOT DEVICE

CROSS-REFERENCE TO RELATED APPLICATIONS

Pursuant to 35 U.S.C. § 119(a), this application claims the benefit of earlier filing date and right of priority to Korean Patent Application No. 10-2019-0148936, filed on Nov. 19, 2019, the contents of which are hereby incorporated by reference herein in its entirety.

BACKGROUND OF THE INVENTION

Field of the Invention

The present disclosure relates to a voice recognition method of an artificial intelligence robot device, and more particularly to a voice recognition method of an artificial intelligence robot device capable of improving a voice recognition performance of an airport user by adaptively subtracting a voice collected by a microphone located in an opposite direction of a direction, in which the airport user is located, from a voice collected by a microphone of the direction, in which the airport user is located, if a lot of noise such as announcement of the airport comes into a microphone mounted on a guide robot device.

Discussion of the Related Art

Recently, introduction of robots, etc. is being discussed to provide more efficiently various services to users in public places such as airport. The users can use various services including navigation service in the airport, boarding information guide service, and other multimedia contents provision service, etc. through robots placed at the airport.

However, since the unit cost of high tech devices such as robots is high, the number of airport robots placed in the airport may be limited. Therefore, a method may be required to provide more efficient services using the limited number of airport robots.

In particular, guide robots placed in the airport had many difficulties in recognizing a airport user's voice by various noises generated in the airport.

SUMMARY OF THE INVENTION

An object of the present disclosure is to address the above-described and other needs and/or problems.

Another object of the present disclosure is to provide a voice recognition method of an artificial intelligence robot device capable of improving a voice recognition performance of an airport user by adaptively subtracting a voice collected by a microphone located in an opposite direction of a direction, in which the airport user is located, from a voice collected by a microphone of the direction, in which the airport user is located, if a lot of noise such as announcement of the airport comes into a microphone mounted on a guide robot device.

Another object of the present disclosure is to improve reliability of a voice recognition method of an artificial intelligence robot device by controlling an artificial intelligence robot device through AI processing.

In one aspect of the present disclosure, there is provided a voice recognition method of an artificial intelligence robot device, comprising: collecting a first voice spoken by a user and determining whether a wake-up word of the artificial intelligence robot device is recognized based on the collected first voice; if the wake-up word is not recognized, sensing a location of the user using at least one sensor and determining whether the sensed location of the user is included in a set voice collection range; if the location of the user is included in the voice collection range, learning the first voice and determining a noise state of the first voice based on the learned first voice; collecting a second voice in an opposite direction of the location of the user according to a result of the determined noise state of the first voice; and extracting a feature value of a noise based on the second voice and removing the extracted feature value of the noise from the first voice to obtain the wake-up word.

Effects of a voice recognition method of an artificial intelligence robot device according to embodiments of the present disclosure are described as follows.

The present disclosure can improve a voice recognition performance of an airport user by adaptively subtracting a voice collected by a microphone located in an opposite direction of a direction, in which the airport user is located, from a voice collected by a microphone of the direction, in which the airport user is located, if a lot of noise such as announcement of the airport comes into a microphone mounted on a guide robot device.

The present disclosure can provide best airport services to airport users by accurately recognizing voice of the airport users and rapidly performing an operation according to the recognized voice.

The present disclosure can improve the convenience of an airport user by accurately recognizing voice of the airport user requiring airport services and accurately and rapidly performing an operation according to the recognized result.

The present disclosure can improve reliability of an artificial intelligent robot system by controlling an artificial intelligent robot device through AI processing.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included to provide a further understanding of the disclosure, illustrate embodiments of the disclosure and together with the description serve to explain the principle of the disclosure.

DETAILED DESCRIPTION OF THE EMBODIMENTS

Figure 1:
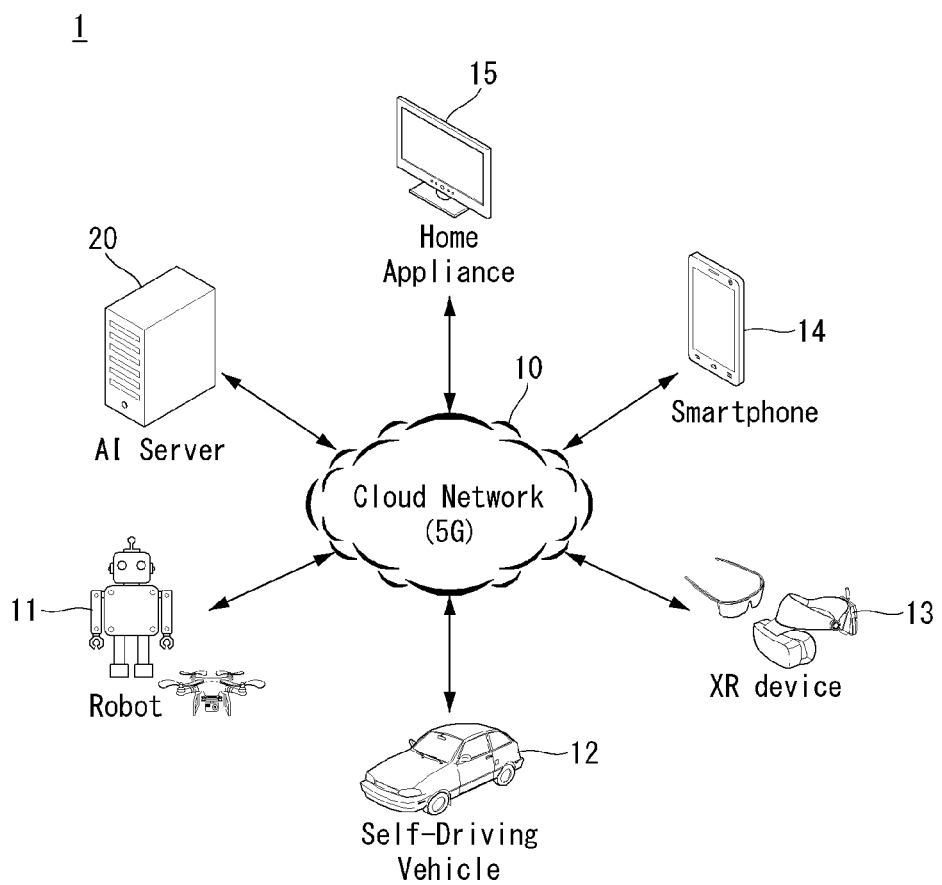
FIG. 1 is a conceptual diagram illustrating an embodiment of an AI device.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

Three major requirement areas of 5G include (1) an enhanced mobile broadband (eMBB) area, (2) a massive machine type communication (mMTC) area, and (3) ultra-reliable and low latency communications (URLLC) area.

Some use cases may require multiple areas for optimization, and other use cases may be focused to only one key performance indicator (KPI). 5G supports these various use cases in a flexible and reliable manner.

The EMBB enables far beyond basic mobile Internet access and covers media and entertainment applications in rich interactive work, cloud or augmented reality. Data is one of key dynamic power of 5G, and in a 5G era, a dedicated voice service may not be seen for the first time. In 5G, a voice is expected to be treated as an application program using data connection simply provided by a communication system. Main reasons for an increased traffic volume are increase in content size and increase in the number of applications requiring a high data transmission rate. Streaming services (audio and video), interactive video, and mobile Internet connections will be used more widely as more devices connect to Internet. These many application programs require always-on connectivity in order to push real-time information and notifications to a user. Cloud storage and applications are growing rapidly in mobile communication platforms, which may be applied to both work and entertainment. Cloud storage is a special use case that drives growth of uplink data transmission rates. 5G is also used for remote tasks in cloud and requires much lower end-to-end delays so as to maintain excellent user experience when tactile interfaces are used. Entertainment, for example, cloud gaming and video streaming is another key factor in increasing the need for mobile broadband capabilities. Entertainment is essential in smartphones and tablets at anywhere including in high mobility environments such as trains, cars and airplanes. Another use case is augmented reality and information search for entertainment.

Here, augmented reality requires very low latency and instantaneous amount of data.

Further, one of most anticipated 5G use cases relates to a function, i.e., mMTC that can smoothly connect embedded sensors in all fields. By 2020 year, potential IoT devices are expected to reach 20.4 billion. Industrial IoT is one of areas in which 5G plays a major role in enabling smart cities, asset tracking, smart utilities, and agriculture and security infrastructure.

URLLC includes new services to transform an industry through ultra-reliable/available low latency links, such as remote control of major infrastructure and self-driving vehicles. A level of reliability and latency is essential for smart grid control, industrial automation, robotics, drone control, and coordination.

Hereinafter, a number of use cases are described in more detail.

5G may complement fiber-to-the-home (FTTH) and cable-based broadband (or DOCSIS) as a means of providing streams that are rated at hundreds of megabits per second to gigabits per second. Such a high speed is required to deliver televisions with a resolution of 4K or more (6K, 8K, and more) as well as virtual reality and augmented reality. Virtual Reality (VR) and Augmented Reality (AR) applications include nearly immersive sporting events. A specific application program may require a special network setting. For example, for VR games, in order to minimize latency, game companies may need to integrate core servers with an edge network server of a network operator.

An automotive is expected to become important new dynamic power for 5G together with many use cases for mobile communication to vehicles. For example, entertainment for passengers requires simultaneous high capacity and high mobility mobile broadband. This is because future users continue to expect high quality connections regardless of a position and speed thereof. Another use case of an automotive sector is an augmented reality dashboard. This identifies objects in the dark above what a driver views through a front window and overlays and displays information that notifies the driver about a distance and movement of the object. In the future, wireless modules enable communication between vehicles, exchange of information between a vehicle and a supporting infrastructure, and exchange of information between a vehicle and other connected devices (e.g., devices carried by pedestrians). A safety system guides alternative courses of an action to enable drivers to safer drive, thereby reducing the risk of an accident. The next step will be a remotely controlled or self-driven vehicle. This requires very reliable and very fast communication between different self-driving vehicles and between automobiles and infrastructure. In the future, self-driving vehicles will perform all driving activities and the driver will focus on traffic anomalies that the vehicle itself cannot identify. The technical requirements of self-driving vehicles require ultra-low latency and ultra-fast reliability so as to increase traffic safety to an unachievable level.

Smart cities and smart homes, referred to as smart societies, will be embedded in a high density wireless sensor network. A distributed network of intelligent sensors will identify conditions for a cost and energy-efficient maintenance of a city or a home. Similar settings may be made for each family. Temperature sensors, window and heating controllers, burglar alarms and home appliances are all connected wirelessly. These many sensors are typically low data rates, low power and low cost. However, for example, real-time HD video may be required in a specific type of device for surveillance.

Consumption and distribution of energy including a heat or a gas is highly decentralized, thereby requiring automated control of distributed sensor networks. Smart grids interconnect these sensors using digital information and communication technology so as to collect information and act accordingly. The information may include a behavior of suppliers and consumers, allowing smart grids to improve distribution of fuels such as electricity in efficiency, reliability, economics, sustainability of production, and in an automated manner. Smart grid may be viewed as another sensor network with low latency.

A health sector has many application programs that can benefit from mobile communication. The communication system may support telemedicine that provides clinical care at a far distance. This may help reduce barriers to distance and improve access to healthcare services that are not consistently available in remote rural areas. It is also used for saving lives in important care and emergency situations. A mobile communication based wireless sensor network may provide remote monitoring and sensors for parameters such as a heart rate and a blood pressure.

Wireless and mobile communication is becoming gradually important in an industrial application field. A wiring requires a highly installing and maintaining cost. Therefore, the possibility of replacing with a wireless link that can reconfigure a cable is an attractive opportunity in many industry fields. However, achieving this requires that a wireless connection operates with reliability, capacity, and delay similar to a cable and that management is simplified. Low latency and very low error probability are new requirements that need to be connected in 5G.

Logistics and freight tracking are important use cases for mobile communication that enable tracking of inventory and packages at anywhere using a position-based information system. A use case of logistics and freight tracking typically requires a low data rate, but requires reliable position information and a wide range.

The present disclosure to be described later in the present specification may be implemented by combining or changing each embodiment so as to satisfy the requirements of the above-described 5G.

FIG. 1 is a conceptual diagram illustrating an embodiment of an AI device.

Referring to FIG. 1, in an AI system, at least one of an AI server 20, a robot 11, an autonomous vehicle 12, an XR device 13, a smartphone 14, or a home appliance 15 is connected to a cloud network 10. Here, the robot 11, the autonomous vehicle 12, the XR device 13, the smartphone 14, or the home appliance 15 to which AI technology is applied may be referred to as AI devices 11 to 15.

The cloud network 10 may mean a network that configures part of a cloud computing infrastructure or that exists inside a cloud computing infrastructure. Here, the cloud network 10 may be configured using a 3G network, a 4G network, a long term evolution (LTE) network, or a 5G network.

That is, each device 11 to 15 and 20 constituting the AI system may be connected to each other through the cloud network 10. In particular, each of the devices 11 to 15 and 20 may communicate with each other through a base station, but may directly communicate with each other without passing through a base station.

The AI server 20 may include a server that performs AI processing and a server that performs operations on big data.

The AI server 20 may be connected to at least one of the robot 11, the autonomous vehicle 12, the XR device 13, the smartphone 14, or the home appliance 15, which are AI devices constituting the AI system through the cloud network 10 and may help at least some of AI processing of the connected AI devices 11 to 15.

In this case, the AI server 20 may learn an artificial neural network according to machine learning algorithm instead of the AI devices 11 to 15 and directly store a learning model or transmit a learning model to the AI devices 11 to 15.

In this case, the AI server 20 may receive input data from the AI devices 11 to 15, infer a result value of the input data received using a learning model, and generate a response or a control command based on the inferred result value to transmit the response or the control command to the AI device s11 and 15.

Alternatively, the AI devices 11 to 15 may directly infer a result value of the input data using a learning model and generate a response or a control command based on the inferred result value.

<AI+Robot>

AI technology is applied to the robot 11, and the robot 11 may be implemented into a guide robot, a transport robot, a cleaning robot, a wearable robot, an entertainment robot, a pet robot, an unmanned aerial robot, or the like.

The robot 11 may include a robot control module for controlling an operation, and the robot control module may mean a software module or a chip implemented in hardware.

The robot 11 may obtain status information of the robot 11 using sensor information obtained from various kinds of sensors, detect (recognize) a surrounding environment and an object, generate map data, determine a moving route and a driving plan, determine a response to a user interaction, or determine an operation.

Here, in order to determine a movement route and a driving plan, the robot 11 may use sensor information obtained from a sensor of at least one of rider, radar, and a camera.

The robot 11 may perform the above operation using a learning model configured with at least of one artificial neural network. For example, the robot 11 may recognize a surrounding environment and an object using a learning model, and determine an operation using the recognized surrounding environment information or object information. Here, the learning model may be directly learned by the robot 11 or may be learned by an external device such as the AI server 20.

In this case, by generating a result directly using a learning model, the robot 11 may perform an operation, but may transmit sensor information to an external device such as the AI server 20 and receive the generated result and perform an operation.

The robot 11 may determine a movement route and a driving plan using at least one of map data, object information detected from sensor information, or object information obtained from an external device, and control a driver to drive the robot 11 according to the determined movement route and driving plan.

The map data may include object identification information about various objects disposed in a space in which the robot 11 moves. For example, the map data may include object identification information about fixed objects such as walls and doors and movable objects such as flower pots and desks. The object identification information may include a name, a kind, a distance, and a position.

Further, by controlling the driver based on the control/interaction of a user, the robot 11 may perform an operation or may drive. In this case, the robot 11 may obtain intention information of an interaction according to the user's motion or voice utterance, and determine a response based on the obtained intention information to perform an operation.

<AI+Autonomous Vehicle>

AI technology is applied to the autonomous vehicle 12 and thus the autonomous vehicle 12 may be implemented into a mobile robot, a vehicle, an unmanned aerial vehicle, or the like.

The autonomous vehicle 12 may include an autonomous driving control module for controlling an autonomous driving function, and the autonomous driving control module may mean a software module or a chip implemented in hardware. The autonomous driving control module may be included inside the autonomous vehicle 12 as a configuration of the autonomous vehicle 12, but may be configured as a separate hardware to be connected to the outside of the autonomous vehicle 12.

The autonomous vehicle 12 may obtain status information thereof using sensor information obtained from various types of sensors, detect (recognize) a surrounding environment and object, generate map data, determine a moving route and a driving plan, or determine an operation.

Here, in order to determine a movement route and a driving plan, the autonomous vehicle 12 may use sensor information obtained from a sensor of at least one of rider, radar, and a camera, similar to the robot 11.

In particular, the autonomous vehicle 12 may recognize an environment or an object about an area in which a field of view is covered or an area of a predetermined distance or more by receiving sensor information from external devices or may directly receive recognized information from external devices.

The autonomous vehicle 12 may perform the above-described operations using a learning model configured with at least one artificial neural network. For example, the autonomous vehicle 12 may recognize a surrounding environment and an object using a learning model, and determine a driving route using the recognized surrounding environment information or object information. Here, the learning model may be learned directly from the autonomous vehicle 12 or may be learned from an external device such as the AI server 20.

In this case, by generating a result directly using a learning model, the autonomous vehicle 12 may perform an operation, but transmit sensor information to an external device such as the AI server 20 and thus receive the generated result to perform an operation.

The autonomous vehicle 12 may determine a moving route and a driving plan using at least one of map data, object information detected from sensor information, or object information obtained from an external device, and controls the driver to drive the autonomous vehicle 12 according to the determined moving route and driving plan.

The map data may include object identification information about various objects disposed in a space (e.g., road) in which the autonomous vehicle 12 drives. For example, the map data may include object identification information about fixed objects such as street lights, rocks, buildings, and movable objects such as vehicles and pedestrians. The object identification information may include a name, a kind, a distance, a position, and the like.

Further, by controlling the driver based on a user's control/interaction, the autonomous vehicle 12 may perform an operation or may drive. In this case, the autonomous vehicle 12 may obtain intention information of an interaction according to the user's motion or voice utterance, and determine a response based on the obtained intention information to perform an operation.

<AI+XR>

AI technology is applied to the XR device 13 and thus the XR device 13 may be implemented into a head-mount display (HMD), a head-up display (HUD) installed in a vehicle, a television, a mobile phone, a smartphone, a computer, a wearable device, a home appliance, digital signage, a vehicle, a fixed robot, or a mobile robot.

The XR device 13 may analyze three-dimensional point cloud data or image data obtained through various sensors or from an external device to generate position data and attribute data of the three-dimensional points, thereby obtaining information about a surrounding space or a reality object and rendering and outputting an XR object to output. For example, the XR device 13 may output an XR object including additional information about the recognized object to correspond to the recognized object.

The XR device 13 may perform the above-described operations using a learning model configured with at least one artificial neural network. For example, the XR device 13 may recognize a real object in 3D point cloud data or image data using the learning model, and provide information corresponding to the recognized real object. Here, the learning model may be learned directly from the XR device 13 or may be learned from an external device such as the AI server 20.

In this case, by generating a result directly using a learning model, the XR device 13 may perform an operation, but transmit sensor information to an external device such as the AI server 20 and receive the generated result to perform an operation.

<AI+Robot+Autonomous Driving>

AI technology and autonomous driving technology are applied to the robot 11 and thus the robot 11 may be implemented into a guide robot, a transport robot, a cleaning robot, a wearable robot, an entertainment robot, a pet robot, an unmanned aerial robot, or the like.

The robot 11 to which AI technology and autonomous driving technology are applied may mean a robot having an autonomous driving function or a robot 11 interacting with the autonomous vehicle 12.

The robot 11 having an autonomous driving function may be collectively referred to as devices that moves by themselves according to a given moving route without a user's control or that determine and move a moving route by themselves.

In order to determine at least one of a movement route or a driving plan, the robot 11 and the autonomous vehicle 12 having an autonomous driving function may use a common sensing method. For example, the robot 11 and the autonomous vehicle 12 having the autonomous driving function may determine at least one of a movement route or a driving plan using information sensed through lidar, radar, and the camera.

While the robot 11 interacting with the autonomous vehicle 12 exists separately from the autonomous vehicle 12, the robot 11 may be linked to an autonomous driving function inside or outside the autonomous vehicle 12 or may perform an operation connected to a user who rides in the autonomous vehicle 12.

In this case, the robot 11 interacting with the autonomous vehicle 12 may obtain sensor information instead of the autonomous vehicle 12 to provide the sensor information to the autonomous vehicle 12 or may obtain sensor information and generate surrounding environment information or object information to provide the surrounding environment information or the object information to the autonomous vehicle 12, thereby controlling or assisting an autonomous driving function of the autonomous vehicle 12.

Alternatively, the robot 11 interacting with the autonomous vehicle 12 may monitor a user who rides in the autonomous vehicle 12 or may control a function of the autonomous vehicle 12 through an interaction with the user. For example, when it is determined that a driver is in a drowsy state, the robot 11 may activate an autonomous driving function of the autonomous vehicle 12 or assist the control of the driver of the autonomous vehicle 12. Here, the function of the autonomous vehicle 12 controlled by the robot 11 may include a function provided by a navigation system or an audio system provided inside the autonomous vehicle 12 as well as an autonomous driving function.

Alternatively, the robot 11 interacting with the autonomous vehicle 12 may provide information from the outside of the autonomous vehicle 12 to the autonomous vehicle 12 or assist a function of the autonomous vehicle 12. For example, the robot 11 may provide traffic information including signal information to the autonomous vehicle 12 as in a smart traffic light and interact with the autonomous vehicle 12 to automatically connect an electric charger to a charging port, as in an automatic electric charger of an electric vehicle.

<AI+Robot+XR>

AI technology and XR technology are applied to the robot 11, and the robot 11 may be implemented into a guide robot, a transport robot, a cleaning robot, a wearable robot, an entertainment robot, a pet robot, an unmanned aerial robot, a drone, or the like.

The robot 11 to which the XR technology is applied may mean a robot to be an object of control/interaction in an XR image. In this case, the robot 11 may be distinguished from the XR device 13 and be interworked with the XR device 13.

When the robot 11 to be an object of control/interaction in the XR image obtains sensor information from sensors including a camera, the robot 11 or the XR device 13 generates an XR image based on the sensor information, and the XR device 13 may output the generated XR image. The robot 11 may operate based on a control signal input through the XR device 13 or a user interaction.

For example, the user may check an XR image corresponding to a viewpoint of the robot 11 remotely linked through an external device such as the XR device 13, and adjust an autonomous driving route of the robot 11 through an interaction, control an operation or driving of the robot 11, or check information of a surrounding object.

<AI+Autonomous Vehicle+XR>

AI technology and XR technology are applied to the autonomous vehicle 12, and the autonomous vehicle 12 may be implemented into a mobile robot, a vehicle, an unmanned aerial vehicle, and the like.

The autonomous vehicle 12 to which XR technology is applied may mean an autonomous vehicle having a means for providing an XR image or an autonomous vehicle to be an object of control/interaction in the XR image. In particular, the autonomous vehicle 12 to be an object of control/interaction in the XR image may be distinguished from the XR device 13 and be interworked with the XR device 13.

The autonomous vehicle 12 having a means for providing an XR image may obtain sensor information from sensors including a camera, and output an XR image generated based on the obtained sensor information. For example, by having an HUD and outputting an XR image, the autonomous vehicle 12 may provide an XR object corresponding to a real object or an object on a screen to an occupant.

In this case, when the XR object is output to the HUD, at least a part of the XR object may be output to overlap with the actual object to which the occupant's eyes are directed. However, when the XR object is output to the display provided inside the autonomous vehicle 12, at least a part of the XR object may be output to overlap with an object on the screen. For example, the autonomous vehicle 12 may output XR objects corresponding to objects such as a road, another vehicle, a traffic light, a traffic sign, a motorcycle, a pedestrian, a building, and the like.

When the autonomous vehicle 12 to be an object of control/interaction in the XR image obtains sensor information from sensors including a camera, the autonomous vehicle 12 or the XR device 13 may generate an XR image based on the sensor information, and the XR device 13 may output the generated XR image. The autonomous vehicle 12 may operate based on a user's interaction or a control signal input through an external device such as the XR device 13.

EXtended Reality (XR) collectively refers to Virtual Reality (VR), Augmented Reality (AR), and Mixed Reality (MR). VR technology is computer graphic technology that provides an object or a background of a real world only to CG images, AR technology is computer graphic technology that together provides virtual CG images on real object images, and MR technology is computer graphic technology that provides by mixing and combining virtual objects in a real world.

MR technology is similar to AR technology in that it shows both a real object and a virtual object. However, there is a difference in that in AR technology, a virtual object is used in the form of supplementing a real object, but in MR technology, a virtual object and a real object are used in an equivalent nature.

XR technology may be applied to a Head-Mount Display (HMD), a Head-Up Display (HUD), a mobile phone, a tablet PC, a laptop computer, a desktop computer, a television, digital signage, etc. and a device to which XR technology is applied may be referred to an XR device.

A. Example of Block Diagram of UE and 5G Network

Figure 2:
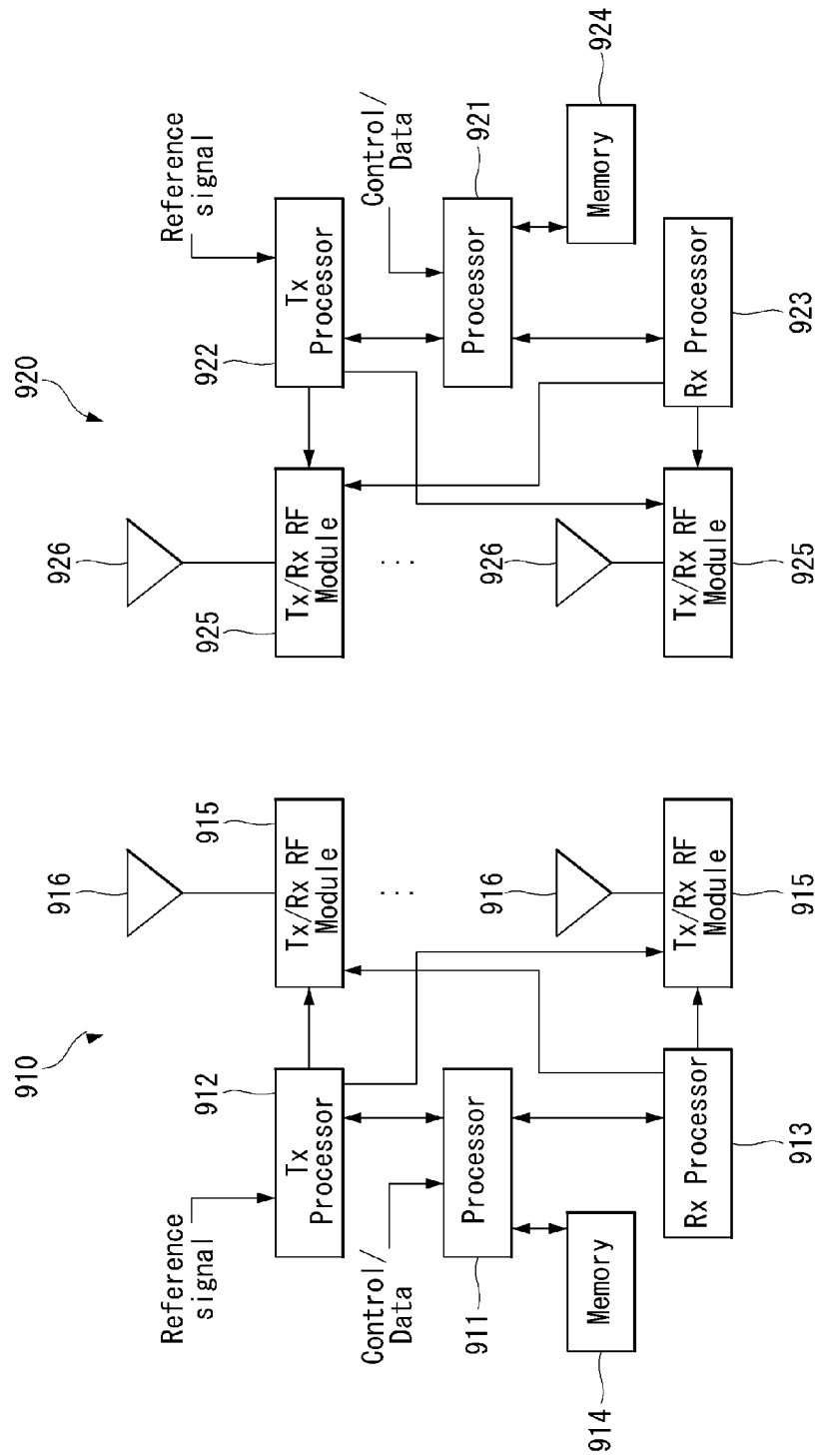
FIG. 2 is a block diagram illustrating a wireless communication system that can be applied to methods proposed in the present specification.

FIG. 2 is a block diagram of a wireless communication system to which methods proposed in the disclosure are applicable.

Referring to FIG. 2, a device (AI device) including an AI module is defined as a first communication device (910 of FIG. 2), and a processor 911 can perform detailed autonomous operations.

A 5G network including another device (AI server) communicating with the AI device is defined as a second communication device (920 of FIG. 2), and a processor 921 can perform detailed autonomous operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
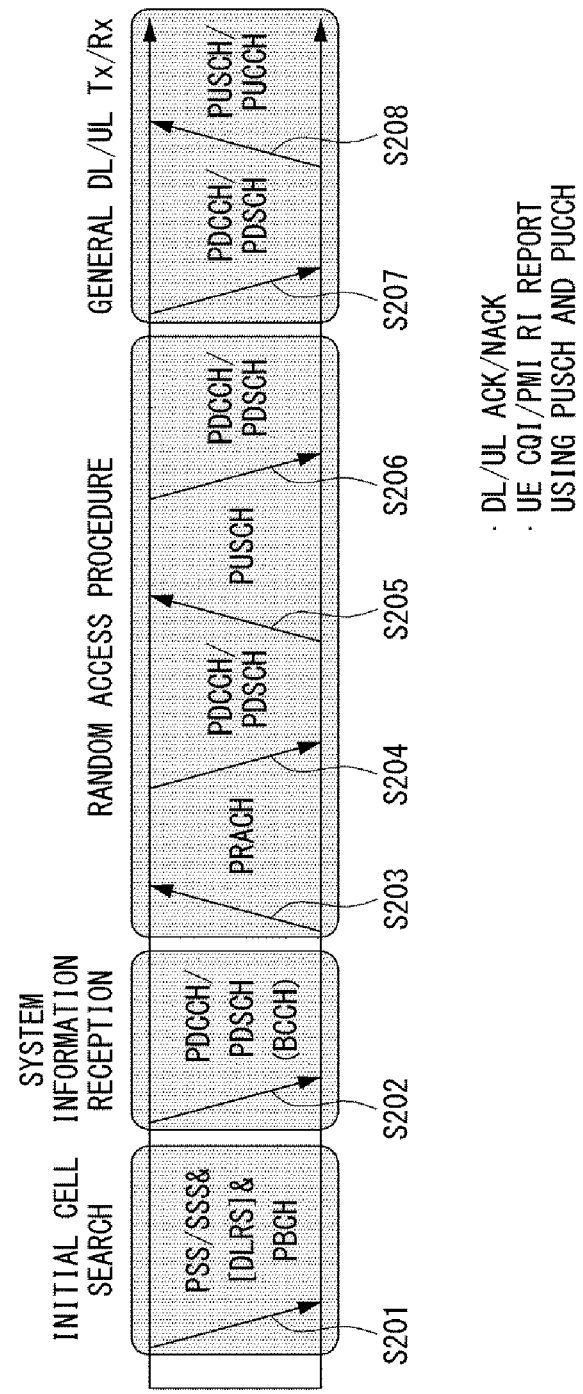
FIG. 3 is a diagram illustrating an example of a signal transmitting/receiving method in a wireless communication system.

FIG. 3 is a diagram showing an example of a signal transmission/reception method in a wireless communication system.

In a wireless communication system, a UE receives information from a base station through downlink (DL), and the UE transmits information to the base station through uplink (UL). The information transmitted and received by the base station and the UE includes data and various control information, and various physical channels exist according to a kind/use of information in which the base station and the UE transmit and receive.

When power of the UE is turned on or when the UE newly enters to a cell, the UE performs an initial cell search operation of synchronizing with the base station (S201). For this reason, the UE may receive a primary synchronization signal (PSS) and a secondary synchronization signal (SSS) from the base station to be synchronized with the base station and obtain information such as cell ID. Thereafter, the UE may receive a physical broadcast channel (PBCH) from the base station to obtain broadcast information within the cell. The UE may receive a downlink reference signal (DL RS) in an initial cell search step to check a downlink channel status.

The UE, having finished initial cell search may receive a physical downlink shared channel (PDSCH) according to a physical downlink control channel (PDCCH) and information loaded in the PDCCH to obtain more specific system information (S202).

When the UE first accesses to the base station or when there is no radio resource for signal transmission, the UE may perform a random access procedure (RACH) to the base station (S203 to S206). For this reason, the UE may transmit a specific sequence to a preamble through a physical random access channel (PRACH) (S203 and S205) and receive a random access response (RAR) message to the preamble through the PDCCH and the PDSCH corresponding thereto. In the case of a contention-based RACH, the UE may additionally perform a contention resolution procedure (S206).

The UE, having performed the above process may perform PDCCH/PDSCH reception (S207) and physical uplink shared channel (PUSCH)/physical uplink control channel (PUCCH) transmission (S208) as a general uplink/downlink signal transmission procedure. In particular, the UE receives downlink control information (DCI) through the PDCCH. Here, the DCI includes control information such as resource allocation information for the UE and may be applied in different formats according to a use purpose.

Control information transmitted by the UE to the base station through uplink or received by the UE from the base station may include a downlink/uplink ACK/NACK signal, a channel quality indicator (CQI), a precoding matrix index (PMI), and a rank indicator (RI). The UE may transmit control information such as the above-described CQI/PMI/RI through a PUSCH and/or a PUCCH.

The UE monitors a set of PDCCH candidates at monitoring occasions set to at least one control element sets (CORESETs) on a serving cell according to the corresponding search space configurations. A set of PDCCH candidates to be monitored by the UE is defined in terms of search space sets, and the search space sets may be a common search space set or a UE-specific search space set. The CORESET is configured with a set of (physical) resource blocks having time duration of 1 to 3 OFDM symbols. The network may set the UE to have a plurality of CORESETs. The UE monitors PDCCH candidates in at least one search space sets. Here, monitoring means attempting to decode the PDCCH candidate(s) in the search space. When the UE succeeds in decoding one of PDCCH candidates in a search space, the UE determines that the PDCCH has been detected in the corresponding PDCCH candidate, and performs PDSCH reception or PUSCH transmission based on DCI in the detected PDCCH. The PDCCH may be used for scheduling DL transmissions on the PDSCH and UL transmissions on the PUSCH. Here, DCI on the PDCCH includes a downlink assignment (i.e., downlink grant (DL grant)) including at least modulation and coding format and resource allocation information related to a downlink shared channel or uplink grant (UL grant) including modulation and coding format and resource allocation information related to an uplink shared channel.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 4:
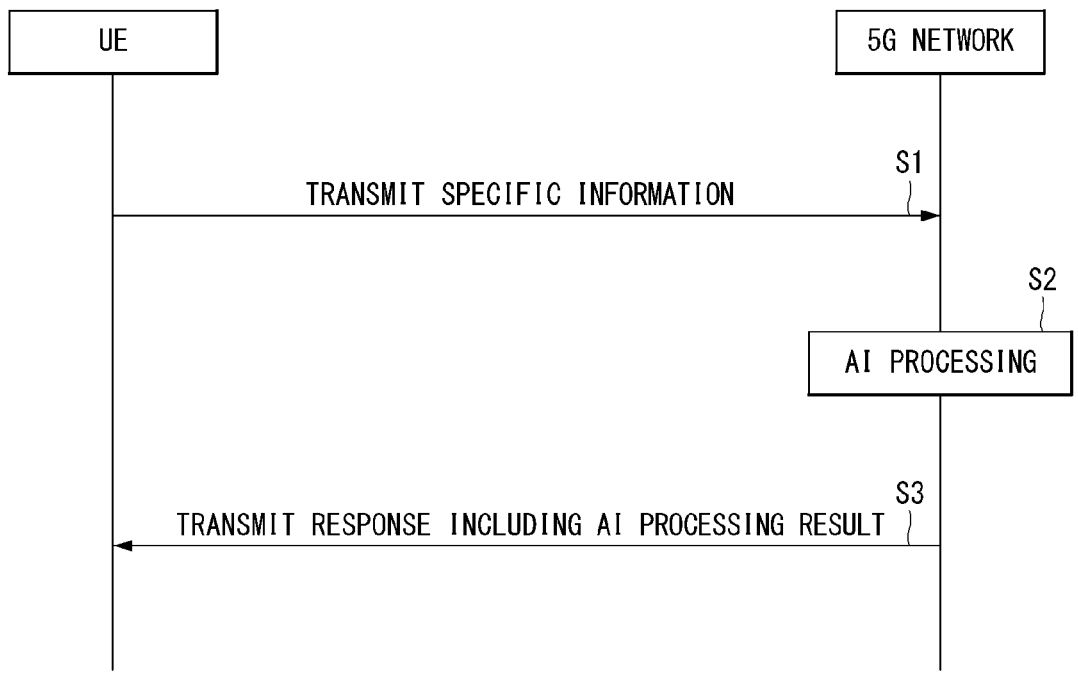
FIG. 4 illustrates an example of a basic operation of a user terminal and a 5G network in a 5G communication system.

FIG. 4 shows an example of basic operations of a Robot and a 5G network in a 5G communication system.

The Robot transmits specific information to the 5G network (S1). The 5G network may perform 5G processing related to the specific information (S2). Here, the 5G processing may include AI processing. And the 5G network may transmit response including AI processing result to Robot (S3).

G. Applied Operations Between Robot and 5G Network in 5G Communication System

Hereinafter, the operation of a Robot using 5G communication will be described in more detail with reference to wireless communication technology (BM procedure, URLLC, mMTC, etc.) described in FIGS. 2 and 3.

First, a basic procedure of an applied operation to which a method proposed by the present disclosure which will be described later and eMBB of 5G communication are applied will be described.

As in steps S1 and S3 of FIG. 4, the Robot performs an initial access procedure and a random access procedure with the 5G network prior to step S1 of FIG. 4 in order to transmit/receive signals, information and the like to/from the 5G network.

More specifically, the Robot performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the Robot receives a signal from the 5G network.

In addition, the Robot performs a random access procedure with the 5G network for UL synchronization acquisition and/or UL transmission. The 5G network can transmit, to the Robot, a UL grant for scheduling transmission of specific information. Accordingly, the Robot transmits the specific information to the 5G network on the basis of the UL grant. In addition, the 5G network transmits, to the Robot, a DL grant for scheduling transmission of 5G processing results with respect to the specific information. Accordingly, the 5G network can transmit, to the Robot, information (or a signal) related to remote control on the basis of the DL grant.

Next, a basic procedure of an applied operation to which a method proposed by the present disclosure which will be described later and URLLC of 5G communication are applied will be described.

As described above, a Robot can receive DownlinkPreemption IE from the 5G network after the Robot performs an initial access procedure and/or a random access procedure with the 5G network. Then, the Robot receives DCI format 2_1 including a preemption indication from the 5G network on the basis of DownlinkPreemption IE. The Robot does not perform (or expect or assume) reception of eMBB data in resources (PRBs and/or OFDM symbols) indicated by the preemption indication. Thereafter, when the Robot needs to transmit specific information, the Robot can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the Robot receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the Robot transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

H. Autonomous Driving Operation Between Robots Using 5G Communication

Figure 5:
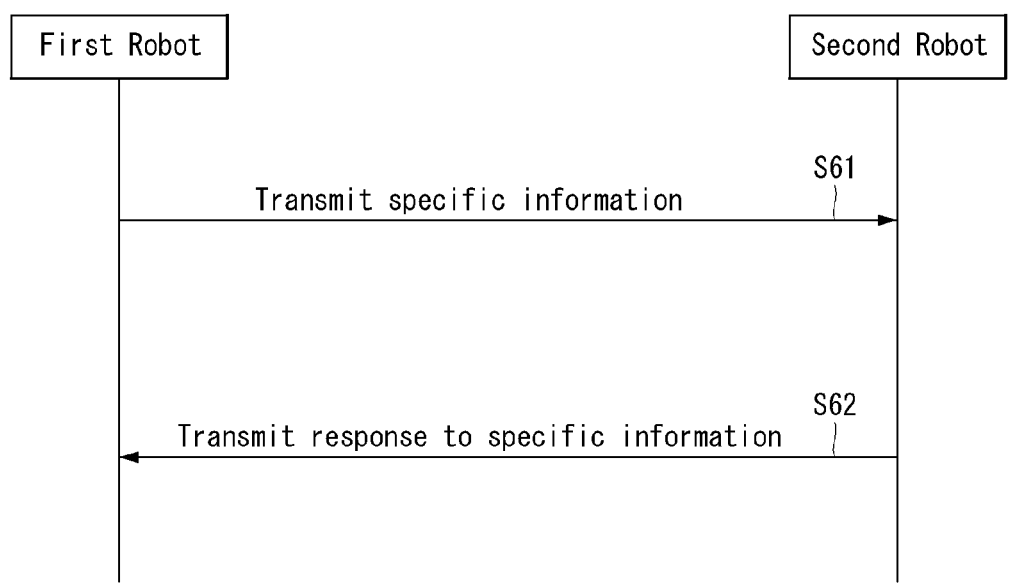
FIG. 5 illustrates an example of a basic operation of robot-to-robot using 5G communication.

FIG. 5 shows an example of a basic operation between robots using 5G communication.

A first robot transmits specific information to a second robot (S61). The second robot transmits a response to the specific information to the first robot (S62).

Meanwhile, a configuration of an applied operation between robots may depend on whether the 5G network is directly (sidelink communication transmission mode 3) or indirectly (sidelink communication transmission mode 4) involved in resource allocation for the specific information and the response to the specific information.

Next, an applied operation between robots using 5G communication will be described.

First, a method in which a 5G network is directly involved in resource allocation for signal transmission/reception between robots will be described.

The 5G network can transmit DCI format 5A to the first robot for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first robot transmits SCI format 1 for scheduling of specific information transmission to the second robot over a PSCCH. Then, the first robot transmits the specific information to the second robot over a PSSCH.

Next, a method in which a 5G network is indirectly involved in resource allocation for signal transmission/reception will be described.

The first robot senses resources for mode-4 transmission in a first window. Then, the first robot selects resources for mode-4 transmission in a second window on the basis of the sensing result. Here, the first window refers to a sensing window and the second window refers to a selection window. The first robot transmits SCI format 1 for scheduling of transmission of specific information to the second robot over a PSCCH on the basis of the selected resources. Then, the first robot transmits the specific information to the second robot over a PSSCH.

The above-described 5G communication technology can be combined with methods proposed in the present disclosure which will be described later and applied or can complement the methods proposed in the present disclosure to make technical features of the methods concrete and clear.

Figure 6:
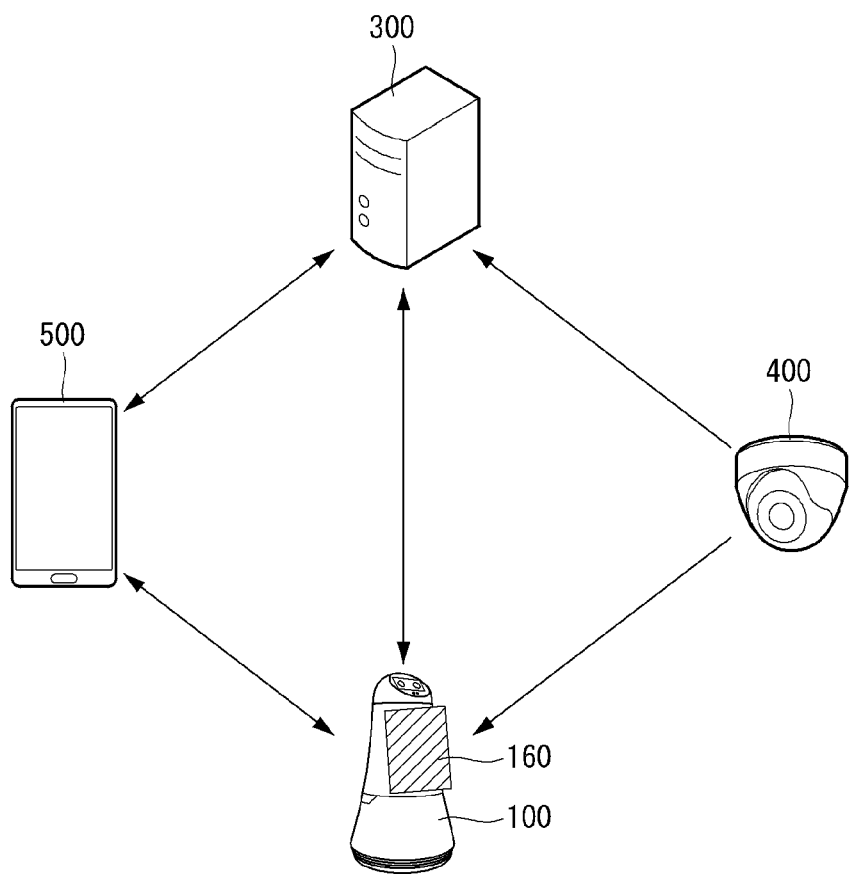
FIG. 6 illustrates a voice recognition method of an artificial intelligence robot device according to an embodiment of the present disclosure.

FIG. 6 illustrates a voice recognition method of an artificial intelligence robot device according to an embodiment of the present disclosure.

Referring to FIG. 6, a voice recognition method of an artificial intelligence robot device according to an embodiment of the present disclosure may include an artificial intelligence robot device 100, a server 300, a camera 400, and a smart device 500.

The artificial intelligence robot device 100 may serve as patrol, guide, cleaning, disinfect, transport, and the like in the airport. For example, the artificial intelligence robot device 100 may travel around or indoors the general exhibition hall, museum, exhibition, airport, etc., and may provide various information to customers or airport users.

The artificial intelligence robot device 100 may transmit and receive signals to and from the server 300 or the smart device 500. For example, the artificial intelligence robot device 100 may transmit and receive a signal including information on a situation in the airport to and from the server 300.

The artificial intelligence robot device 100 may receive, from the camera 400 of the airport, image information of respective zones of the airport taken with the camera 400. Thus, the artificial intelligence robot device 100 may monitor the situation of the airport by combining image information taken by the artificial intelligence robot device 100 and image information received from the camera 400.

The artificial intelligence robot device 100 may receive a command directly from the airport user. For example, the artificial intelligence robot device 100 may receive a command directly from the airport user through an input of touching a display 160 included in the artificial intelligence robot device 100 or a voice input through a microphone, and the like.

The artificial intelligence robot device 100 may perform an operation such as patrol, guide, and cleaning according to commands received from the airport user, the server 300, or the smart device 500, etc.

The server 300 may receive information from the artificial intelligence robot device 100, the camera 400, and/or the smart device 500. The server 300 may combine, store, and manage information received from the respective components. The server 300 may transmit the stored information to the artificial intelligence robot device 100 or the smart device 500. The server 300 may send a command signal for each of a plurality of artificial intelligence robot devices 100 disposed in the airport.

The server 300 may transmit, to the artificial intelligence robot device 100, airport-related data such as airport maps and mapping data including information about objects disposed in the airport or person moving in the airport.

The camera 400 may include cameras installed in the airport. For example, the camera 400 may include all of a plurality of closed circuit television (CCTV) cameras installed in the airport, an infrared thermal sensor camera, and the like. The camera 400 may sends images taken with the camera 400 to the server 300 or the artificial intelligence robot device 100. The image taken with the camera 400 may be referred to as an airport image.

The smart device 500 may transmit and receive data to and from the server 300 or the artificial intelligence robot device 100 in the airport. For example, the smart device 500 may receive airport-related data, such as flight time schedule, airport map, etc., from the artificial intelligence robot device 100 or the server 300. The airport user may receive and obtain information required in the airport from the artificial intelligence robot device 100 or the server 300 through the smart device 500. The smart device 500 may transmit data, such as photographs, video, message, etc., to the artificial intelligence robot device 100 or the server 300. For example, the airport user may send a picture of a missing child to the artificial intelligence robot device 100 or the server 300 to report the missing child, or may request the cleaning of the corresponding zone by taking a picture of the zone requiring the cleaning in the airport and transmitting the picture to the server 300.

The smart device 500 may transmit, to the artificial intelligence robot device 100, a signal for calling the artificial intelligence robot device 100, a signal for instructing to perform a specific operation, an information request signal, or the like. The artificial intelligence robot device 100 may move to a location of the smart device 500 in response to a call signal received from the smart device 500 or perform an operation corresponding to a command signal.

Alternatively, the artificial intelligence robot device 100 may transmit data corresponding to the information request signal to the smart device 500 of each airport user.

Figure 7:
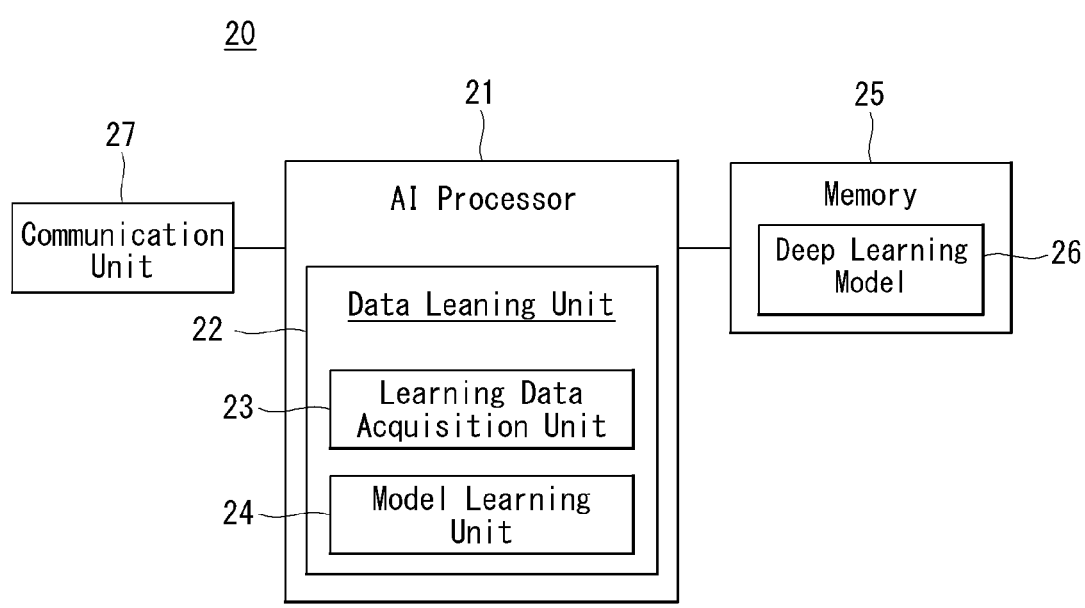
FIG. 7 is a block diagram of an AI device according to an embodiment of the present disclosure.

FIG. 7 is a block diagram of an AI device according to an embodiment of the present invention.

An AI device 20 may include an electronic device including an AI module capable of performing AI processing, or a server including the AI module, or the like. Further, the AI device 20 may be included as at least some components of the intelligent robot device 100 illustrated in FIG. 6 and perform together at least a part of the AI processing.

The AI processing may include all operations related to driving of the intelligent robot device 100 illustrated in FIG. 6. For example, the intelligent robot device 100 can perform AI processing on image signals or sensing data to perform processing/decision operation and a control signal generation operation. For example, the intelligent robot device 100 can perform AI processing on data acquired through interaction with other electronic devices (e.g., the server 300 (see FIG. 6), the mobile terminal 500 (see FIG. 6), the second intelligent robot device (see FIG. 4)) included in the airport to perform the control of driving.

The AI device 20 may include an AI processor 21, a memory 25, and/or a communication unit 27.

The AI device 20 is a computing device capable of learning a neutral network and may be implemented as various electronic devices including a server, a desktop PC, a notebook PC, a tablet PC, and the like.

The AI processor 21 may learn a neural network using a program stored in the memory 25. In particular, the AI processor 21 may learn a neural network for recognizing robot related data. Here, the neural network for recognizing the robot related data may be designed to emulate a human brain structure on a computer and may include a plurality of network nodes with weight that emulate neurons in a human neural network. The plurality of network nodes may send and receive data according to each connection relationship so that neurons emulate the synaptic activity of neurons sending and receiving signals through synapses. Here, the neural network may include a deep learning model, which has evolved from a neural network model. In the deep learning model, the plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/write/modify/delete/update data. Further, the memory 25 may store a neural network model (e.g., deep learning model 26) created by a learning algorithm for data classification/recognition according to an embodiment of the present invention.

The AI processor 21 may further include a data learning unit 22 for learning a neural network for data classification/recognition. The data learning unit 22 may learn criteria as to which learning data is used to decide the data classification/recognition and how data is classified and recognized using learning data. The data learning unit 22 may learn a deep learning model by acquiring learning data to be used in learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 20. Further, the data learning unit 22 may be implemented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, vehicle data and/or sample data to be input to a neural network model.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process obtained data so that the obtained data can be used in learning for deciding the situation. For example, the learning data pre-processing unit may process obtained learning data into a predetermined format so that the model learning unit 24 can use the obtained learning data in learning for recognizing images.

Moreover, the learning data selection unit may select data required for learning among learning data obtained by the learning data acquisition unit 23 or learning data pre-processed by the pre-processing unit. The selected learning data may be provided to the model learning unit 24. For example, the learning data selection unit may detect a specific area in an image obtained with a camera of a robot to select only data for objects included in the specific area as learning data.

In addition, the data learning unit 22 may further include a model evaluation unit (not shown) for improving the result of analysis of the neural network model.

The model evaluation unit may input evaluation data to the neural network model and may allow the model learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may transmit, to an external electronic device, a result of the AI processing by the AI processor 21.

Here, the external electronic device may be defined as an intelligent robot device. Further, the AI device 20 may be defined as another intelligent robot device or a 5G network that communicates with the intelligent robot device. The AI device 20 may be implemented by being functionally embedded into various modules included in the intelligent robot device. The 5G network may include a server or a module that performs the control related to the robot.

Although the AI device 20 illustrated in FIG. 7 was functionally separately described into the AI processor 21, the memory 25, the communication unit 27, etc., the above components may be integrated into one module and referred to as an AI module.

Figure 8:
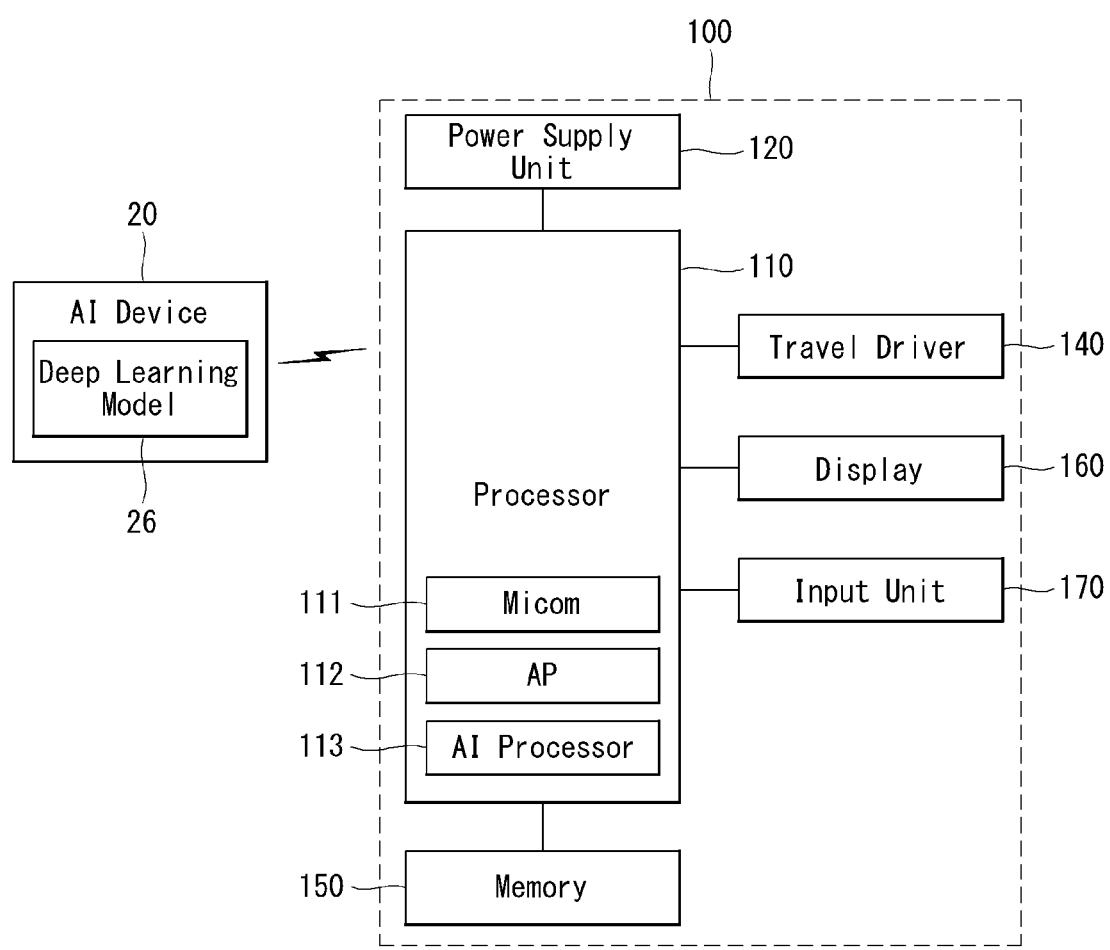
FIG. 8 illustrates a system associated with an AI device and an artificial intelligence robot device according to an embodiment of the present disclosure.

FIG. 8 illustrates a system associated with an AI device and an artificial intelligence robot device according to an embodiment of the present disclosure.

Referring to FIG. 8, an artificial intelligence robot device 100 may transmit data requiring AI processing to an AI device 20 through a communication unit, and the AI device 20 including a deep learning model 26 may transmit a result of AI processing using the deep learning model 26 to the artificial intelligence robot device 100. The AI device 20 may refer to the description described above with reference to FIG. 7.

The artificial intelligence robot device 100 may include a memory 150, a processor 110, and a power supply unit 120. The processor 110 may include a Micom 111 and an application processor (AP) 112 and may further include an AI processor 113.

The artificial intelligence robot device 100 may include an interface unit that is wiredly or wirelessly connected to at least one electronic device included in the artificial intelligence robot device 100 and can exchange data necessary for the travel control. At least one electronic device connected through the interface unit may include a travel driver 140, a display 160, an input unit 170, a transceiver 190, and the like. The interface unit may consist of at least one of a communication module, a terminal, a pin, a cable, a port, a circuit, an element, or a device.

The memory 150 is electrically connected to the processor 110. The memory 150 may store basic data for a unit, control data for operation control of the unit, and input/output data. The memory 150 may store data processed in the processor 110. The memory 150 may consist of at least one of a ROM, RAM, EPROM, flash drive, or hard drive in hardware. The memory 150 may store a variety of data for overall operation of the artificial intelligence robot device 100, such as a program for the processing or control of the processor 110. The memory 150 may be integrally implemented with the processor 110. In some embodiments, the memory 150 may be classified into a sub-component of the processor 110.

The power supply unit 120 may supply power to the artificial intelligence robot device 100. The power supply unit 120 may receive power from a power source (e.g., battery) included in the artificial intelligence robot device 100 and supply power to each unit of the artificial intelligence robot device 100. The power supply unit 120 may operate in response to a control signal provided by main ECU. The power supply unit 120 may include a switched-mode power supply (SMPS).

The processor 110 may be electrically connected to the memory 150, the interface unit (not shown), and the power supply unit 120 and may exchange signals with them. The processor 110 may be implemented using at least one of ASICs (application specific integrated circuits), DSPs (digital signal processors), DSPDs (digital signal processing devices), PLDs (programmable logic devices), FPGAs (field programmable gate arrays), controllers, micro-controllers, or electrical units for performing other functions.

The processor 110 may be driven by power provided by the power supply unit 120. The processor 110 may receive data in a state where power is provided by the power supply unit 120, process data, generate a signal, and provide the signal.

The processor 110 may receive information from other electronic device included in the artificial intelligence robot device 100 through the interface unit. The processor 110 may provide a control signal to other electronic device included in the artificial intelligence robot device 100 through the interface unit.

The artificial intelligence robot device 100 may include at least one printed circuit board (PCB). The memory 150, the interface unit, the power supply unit 120, and the processor 110 may be electrically connected on the printed circuit board.

Other electronic device included in the artificial intelligence robot device 100 connected to the interface unit, the Micom 111, the AP 112, and the AI processor 113 are described in more detail below. Hereinafter, the artificial intelligence robot device 100 is referred to as a robot 100 for convenience of explanation.

The artificial intelligence robot device 100 may include a body with a predetermined shape. The body may have any shape as long as it can protect the components disposed therein from foreign substances or obstacles generated from the outside.

The artificial intelligence robot device 100 may include the transceiver 190, the input unit 170, the processor 110, the display 160, and the travel driver 140.

The transceiver 190 may be embedded in the body of the artificial intelligence robot device 100. The transceiver 190 may receive images taken with a plurality of cameras disposed in the airport and receive mapping data for obstacles located in the airport and movement path data or movement prediction data for the airport user.

The transceiver 190 may transmit, to the server, etc., a user's voice collected by the artificial intelligence robot device 100 and receive various voice related information from the server. The transceiver 190 may include a 5G router 162 (see FIG. 9). The transceiver 190 may receive mapping data, movement path data, movement prediction data, and voice related data using 5G communication or 5G network. The obstacle may include the airport user or the customer moving in the airport, or an object placed at the airport, or the like.

An image taken with the plurality of cameras disposed in the airport may be referred to as an airport image.

The input unit 170 may be disposed at the body to take an image of the obstacle on or around the path of the artificial intelligence robot device 100, or collect sound generated in the airport, or collect airport users' voice located around the artificial intelligence robot device 100. The input unit 170 may include at least one camera and at least one microphone. The at least one camera may be referred to as a robot camera. The robot camera may take in real time an image of surroundings of the artificial intelligence robot device 100 that is travelling or moving. An image taken with the robot camera may be referred to as a patrol image, a moving image, a robot image. The at least one microphone may be referred to as a robot microphone. The robot microphone may collect in real time sound and voice generated around the artificial intelligence robot device 100 that is travelling or moving.

The processor 110 may receive movement information of the airport user from the transceiver 190, learn the movement information of the airport user, recognize a wandering state of the airport user based on the learned movement information of the airport user, and control the airport user to move based on a result of the recognition. Alternatively, the processor 110 may receive information related to airport user's voice from the transceiver 190 or directly, learn the information related to airport user's voice, recognize a noise state of the voice from the airport user's voice based on the learned airport user's voice, and perform an operation corresponding to a wake-up word obtained according to a result of recognition.

The processor 110 may extract feature values from the movement information of the airport user received from the transceiver 190, input the feature values to an artificial neural network (ANN) classifier to distinguish whether or not the airport user is in the wandering state, and determine the wandering state of the airport user based on an output of the artificial neural network. Alternatively, the processor 110 may extract feature values from the airport user's voice received from the transceiver 190, input the feature values to the ANN in order to distinguish whether the airport user's voice is in a noise state, and determine the noise state of the airport user's voice based on an output of the ANN The processor 110 may give different weight values to the extracted feature values. The processor 110 may determine a priority of the feature values based on the given weight values, and control the movement of one or more artificial intelligence robot devices of a plurality of artificial intelligence robot devices based on the determined priority.

The travel driver 140 may be positioned on the lower side of the body and may move toward a target location under the control of the processor 110. The travel driver 140 will be described in detail later. The travel driver 140 may move in the airport based on the mapping data, the movement path data, and the movement prediction data provided by the transceiver 190 and the robot image provided by the input unit 170 under the control of the processor 110.

The display 160 may be disposed in front or on a front surface of the body and may display information on airport services. For example, the display 160 may display execution screen information of an application program run by the artificial intelligence robot device 100 or information on a user interface (UI) and a graphic user interface (GUI) according to the execution screen information.

The display 160 may include at least one of a liquid crystal display (LCD), a thin film transistor liquid crystal display (TFT LCD), an organic light emitting diode (OLED)

display, a flexible display, a three-dimensional (3D) display, and an electronic ink (e-ink) display.

Two or more displays 160 may exist according to a shape of the artificial intelligence robot device 100. In this case, in the artificial intelligence robot device 100, the plurality of displays 160 may be disposed in front (or the front surface) or in rear (or the rear surface).

The display 160 may include a touch sensor. The display 160 may receive a control command using the touch sensor. For example, if a touch of the display 160 is sensed, the touch sensor may generate a control command or a command signal corresponding to the touch under the control of the processor 110. The contents input by the touch method may include information about the airport services, an airport service menu item, and the like.

The display 160 may form a touch screen or a touch monitor with the touch sensor. In this case, the touch screen may serve as a user interface. The display 160 may be referred to as a user interface.

The artificial intelligence robot device 100 may transmit data obtained through the at least one sensor to the AI device 20 through the transceiver 190, and the AI device 20 may transmit, to the artificial intelligence robot device 100, AI processing data generated by applying the deep learning model 26 to the transmitted data. The artificial intelligence robot device 100 may recognize information about a movement path and a movement prediction path that are detected based on the received AI processing data, and the processor 110 may perform a travel control operation using the recognized information.

The transceiver 190 may exchange signals with a device positioned outside the artificial intelligence robot device 100. The transceiver 190 may exchange signals with at least one of an infrastructure (e.g., a server or a broadcasting station), another artificial intelligence robot device 100, or a terminal. The transceiver 190 may include at least one of a transmit antenna, a receive antenna, a radio frequency (RF) circuit capable of implementing various communication protocols, and an RF element, in order to perform communication.

The artificial intelligence robot device 100 may generate at least one of information on a moving direction of the airport user, movement path information, or movement prediction information by applying movement path data and/or movement prediction data of the airport user provided through the transceiver 190 to the neural network model, at least one of information on a moving direction of the airport user, movement path information, or movement prediction information. Alternatively, the artificial intelligence robot device 100 may accurately recognize or obtain a wake-up word removing a noise from an airport user's voice by applying information or data related to the airport user's voice provided through the transceiver 190 to the neural network model, The AI processor 113 may generate a signal for controlling the movement of the artificial intelligence robot device 100 according to a driving plan created by the processor 110 in a travel mode.

The artificial intelligence robot device 100 may transmit data necessary for the travel control to the AI device 20 through the transceiver 190, and the AI device 20 may transmit, to the artificial intelligence robot device 100, AI processing data generated by applying the neural network model to the transmitted data. The artificial intelligence robot device 100 may use the received AI processing data to control the movement of the artificial intelligence robot device 100 in the airport.

The travel driver 140 may include at least one electronic control device (e.g., control electronic control unit (ECU)).

The travel driver 140 may control a power train, a steering device, and a brake device based on the signal received by the processor 110. The signal received by the processor 110 may be a travel control signal generated by applying the neural network model to data related to the artificial intelligence robot device 100 in the AI processor 113. The travel control signal may be a signal received from the AI device 20 positioned outside through the transceiver 190.

A sensing unit 130 may sense a state of the artificial intelligence robot device 100. The sensing unit 130 may include at least one of an inertial measurement unit (IMU) sensor, a collision sensor, a wheel sensor, a speed sensor, a tilt sensor, a weight sensor, a heading sensor, a gyro sensor, a position module, a robot forward/reverse sensor, a battery sensor, a tire sensor, a steering sensor, a temperature sensor, a humidity sensor, an ultrasonic sensor, or an illumination sensor. The IMU sensor may include one or more of an acceleration sensor, a gyro sensor, and a magnetic sensor.

The sensing unit 130 may be referred to as an obstacle recognition unit.

The AI processor 113 may generate state data of the artificial intelligence robot device 100 by applying the neural network model to sensing data generated in at least one sensor. The AI processing data generated by applying the neural network model may include robot motion data, robot yaw data, robot roll data, robot pitch data, robot collusion data, robot direction data, robot angle data, robot speed data, robot acceleration data, robot tilt data, robot forward/reverse data, robot weight data, battery data, tire air pressure data, robot internal temperature data, robot internal humidity data, steering wheel rotation angle data, robot external illuminance data, acceleration data, brake data, and the like.

The processor 110 may generate a travel control signal based on the AI-processed state data of the robot.

The artificial intelligence robot device 100 may transmit the sensing data obtained through the at least one sensor to the AI device 20 through the transceiver 190, and the AI device 20 may transmit, to the artificial intelligence robot device 100, AI processing data generated by applying the deep learning model 26 to the transmitted data.

A location recognition unit 180 may generate location data of the artificial intelligence robot device 100. The location recognition unit 180 may be referred to as a location recognition unit. The location recognition unit 180 may include at least one of a global positioning system (GPS) and a differential global positioning system (DGPS).

The AI processor 113 may generate more accurate location data of the robot by applying the neural network model to location data generated by at least one location recognition unit 180.

According to an embodiment of the present disclosure, the AI processor 113 may perform deep learning calculation based on at least one of an inertial measurement unit (IMU) of the sensing unit 130 and a camera image, and correct location data based on the generated AI processing data.

The artificial intelligence robot device 100 may transmit the location data obtained from the location recognition unit 180 to the AI device 20 through the transceiver 190, and the AI device 20 may transmit, to the artificial intelligence robot device 100, AI processing data generated by applying the deep learning model 26 to the transmitted location data.

The artificial intelligence robot device 100 may include an internal communication system (not shown). A plurality of electronic devices included in the artificial intelligence robot device 100 may exchange signals by the medium of the internal communication system. Data may be included in the signals. The internal communication system (not shown) may use at least one communication protocol (e.g., CAN, LIN, FlexRay, MOST, Ethernet, etc.).

The processor 110 may create a path for travel based on obtained data and create a driving plan for travel along the created path.

The processor 110 may implement at least one of an autonomous emergency braking (AEB) system, a forward collision warning (FCW) system, a target following assist (TFA) system, a blind spot detection (BSD) system, an auto parking system (APS), a PD collision warning system, a night vision (NV) system, a client status monitoring (CSM) system, and a client jam assist (CJA) system.

The AI processor 113 may send, to the processor 110, a control signal capable of performing at least one of functions of the above-described systems by applying the neural network model to airport user related information received from at least one sensor included in the artificial intelligence robot device 100 and an external device, and information received from another artificial intelligence robot device 100 communicating with the artificial intelligence robot device 100.

The artificial intelligence robot device 100 may transmit at least one data for performing the functions of the various systems to the AI device 20 through the transceiver 190. The AI device 20 may send, to the artificial intelligence robot device 100, a control signal capable of performing the functions of the various systems by applying the deep learning model 26 to the received data.

So far, the embodiments of the present disclosure have described that 5G communication required to implement the robot control method and the AI processing applying the 5G communication are performed, and a result of the AI processing are transmitted and received.

Detailed configuration of the artificial intelligence robot device according to an embodiment of the present disclosure is described below.

Figure 9:
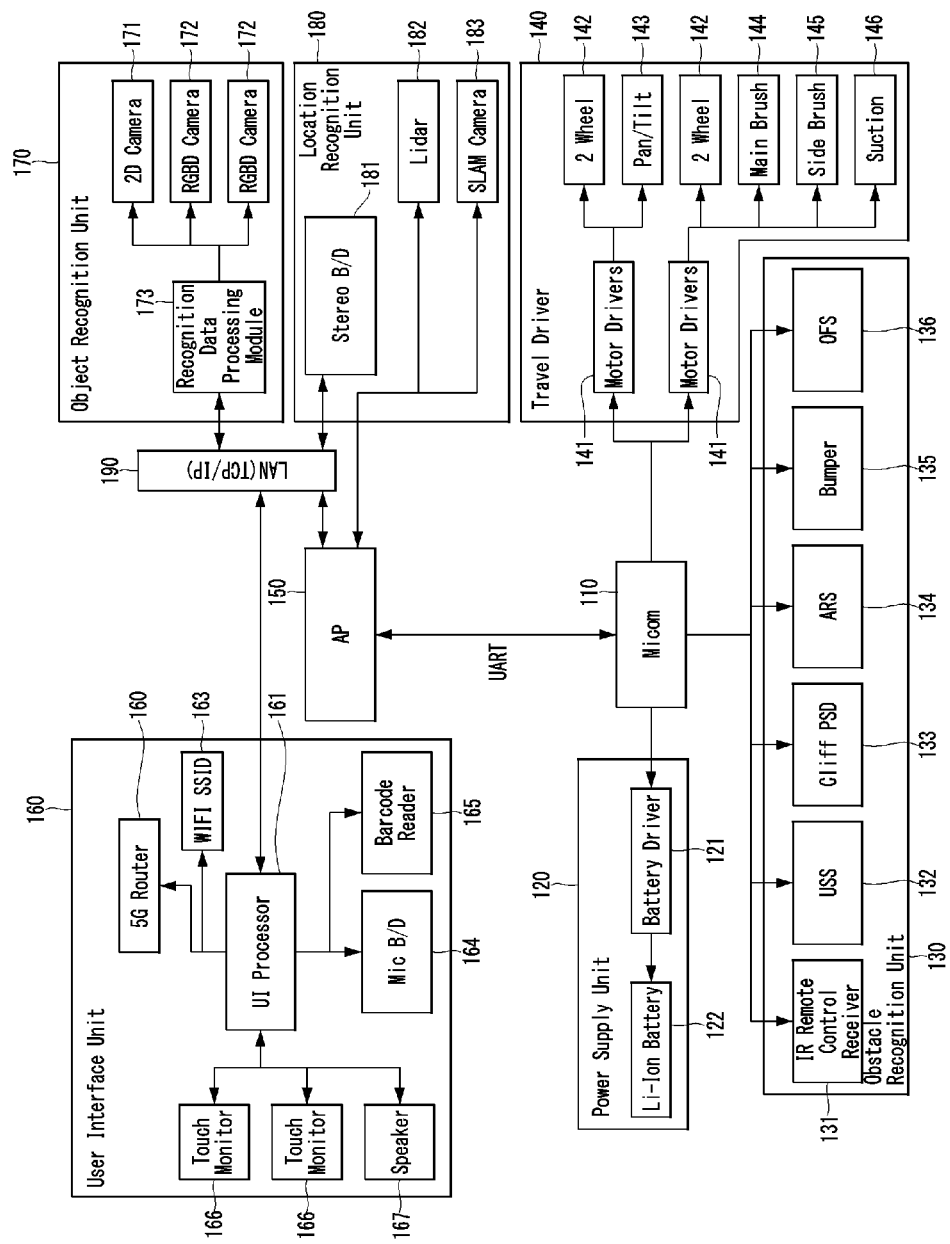
FIG. 9 is a block diagram illustrating a hardware configuration of an artificial intelligence robot device according to an embodiment of the present disclosure.

FIG. 9 is a block diagram illustrating a hardware configuration of an artificial intelligence robot device according to an embodiment of the present disclosure.

As illustrated in FIG. 9, a processor of an artificial intelligence robot device 100 according to an embodiment of the present disclosure may consist of a chip divided into a Micom and an application processor (AP). However, the present disclosure is not limited thereto. For example, the Micom and the AP may be configured as one chip.

A Micom 110 may manage a power supply unit 120 including a battery, etc., an obstacle recognition unit 130 including various sensors, and a travel driver 140 including a plurality of motors and wheels in the hardware of the artificial intelligence robot device 100. The Micom 111 may be referred to as a first controller 110.

The power supply unit 120 may include a battery driver 121 and a Li-ion battery 122. The battery driver 121 may manage the charging and discharging of the Li-ion battery 122. The Li-ion battery 122 may supply electric power for the driving of the artificial intelligence robot device 100. For example, the Li-ion battery 122 may be configured by connecting two 24V/102A Li-ion batteries in parallel.

The obstacle recognition unit 130 may include an IR remote control receiver 131, an ultrasonic sensor (US S) 132, a cliff PSD 133, an attitude reference system (ARS) 134, a bumper 135, and an optical flow sensor (OFS) 136.

The IR remote control receiver 131 may include a sensor that receives a signal of an IR remote control for remotely controlling the artificial intelligence robot device 100.

The USS 132 may include a sensor that determines a distance between an obstacle and the artificial intelligence robot device 100 using an ultrasonic signal.

The cliff PSD 133 may include a sensor that senses a cliff or a bluff, etc. in a range of travel of the artificial intelligence robot device 100 in all directions of 360 degrees.

The ARS 134 may include a sensor that can detect an attitude of the artificial intelligence robot device 100. The ARS 134 may include a sensor consisting of 3-axis accelerometer and 3-axis gyroscope that detect an amount of rotation of the artificial intelligence robot device 100.

The bumper 135 may include a sensor that senses a collision between the artificial intelligence robot device 100 and the obstacle. The sensor included in the bumper 135 may sense the collision between the artificial intelligence robot device 100 and the obstacle in a range of 360 degrees.

The OFS 136 may include a sensor that can sense a phenomenon, in which wheels of the artificial intelligence robot device 100 spin during travel of the artificial intelligence robot device 100, and measure a travel distance of the artificial intelligence robot device 100 on various floor surfaces.

The travel driver 140 may include motor drivers 141, a wheel motor 142, a rotary motor 143, a main brush motor 144, a side brush motor 145, and a suction motor 146.

The motor drivers 141 may serve to drive a wheel motor, a brush motor, and a suction motor that are used for the travelling and the cleaning of the artificial intelligence robot device 100.

The wheel motor 142 may drive a plurality of wheels for the travelling of the artificial intelligence robot device 100. The rotary motor 143 may be driven for left-right rotation and up-down rotation of the main body or a head (not shown) of the artificial intelligence robot device 100, or may be driven for the wheel direction change or the rotation of the artificial intelligence robot device 100.

The main brush motor 144 may drive a brush that sweeps up filth on the airport floor. The side brush motor 145 may drive a brush that sweeps up filth on a peripheral area of an outer surface of the artificial intelligence robot device 100. The suction motor 146 may be driven to suck filth on the airport floor.

An application processor (AP) 150 may manage a hardware module system of the artificial intelligence robot device 100. The AP 150 may run an application program for the travelling using location information received from various sensors and may transmit input and output information of airport users to the Micom 110 to drive the motor, etc.

A user interface unit 160 may include a user interface (UI) processor 161, a 5G router 162, WIFI SSID 163, a microphone board 164, a barcode reader 165, a touch monitor 166, and a speaker 167. The user interface unit 160 may be referred to as a display.

The UI processor 161 may control an operation of the user interface unit 160 that is responsible for the input and output of the airport user.

The 5G router 162 may receive necessary information from the outside and perform 5G communication for transmitting information to the airport user.

The WIFI SSID 163 may analyze a signal strength of WiFi and perform location recognition of a specific object or the artificial intelligence robot device 100.

The microphone board 164 may receive a plurality of microphone signals, process a voice signal into voice data which is a digital signal, and analyze a direction of the voice signal and the corresponding voice signal.

The barcode reader 165 may read barcode information stated in a plurality of tickets used in the airport.

The touch monitor 166 may include a touch panel configured to receive an input of the airport user and a monitor for displaying output information.

The speaker 167 may serve to inform the airport user of specific information by voice.

An object recognition unit 170 may include a camera 171, an RGBD camera 172, and a recognition data processing module 173. The object recognition unit 170 may be referred to as an input unit.

The camera 171 may be a sensor for recognizing an obstacle based on a two-dimensional (2D) image. The obstacle may include a person or an object, or the like.

The RGBD (Red, Green, Blue, Distance) camera 172 may be a sensor for detecting an obstacle using captured images having depth data obtained from a camera with RGBD sensors or other similar 3D imaging devices.

The recognition data processing module 173 may process signals such as 2D image/video or 3D image/video obtained from a 2D camera 171 and a RGBD camera 172 and recognize the obstacle.

A location recognition unit 180 may include a stereo board (B/D) 181, a light detection and ranging (LiDAR) 182, and a simultaneous localization and mapping (SLAM) camera 183.

The SLAM camera 183 may implement simultaneous location tracking and mapping technology.

The artificial intelligence robot device 100 may detect surrounding information using the SLAM camera 183 and process the obtained information to thereby create a map corresponding to a task execution space and at the same time estimate its own absolute location.

The LiDAR 182 is a laser radar and may also be a sensor that irradiates a laser beam and collects and analyzes backscattered light among light absorbed or scattered by aerosol to perform location recognition.

The stereo board 181 may process sensing data collected by the LiDAR 182 and the SLAM camera 183, etc. and may be responsible for data management for the location recognition and the obstacle recognition of the artificial intelligence robot device 100.

A LAN 190 may communicate with the UI processor 161 that is related to the input and output of the airport user, the recognition data processing module 173, the stereo board 181, and the AP 150.

Figure 10:
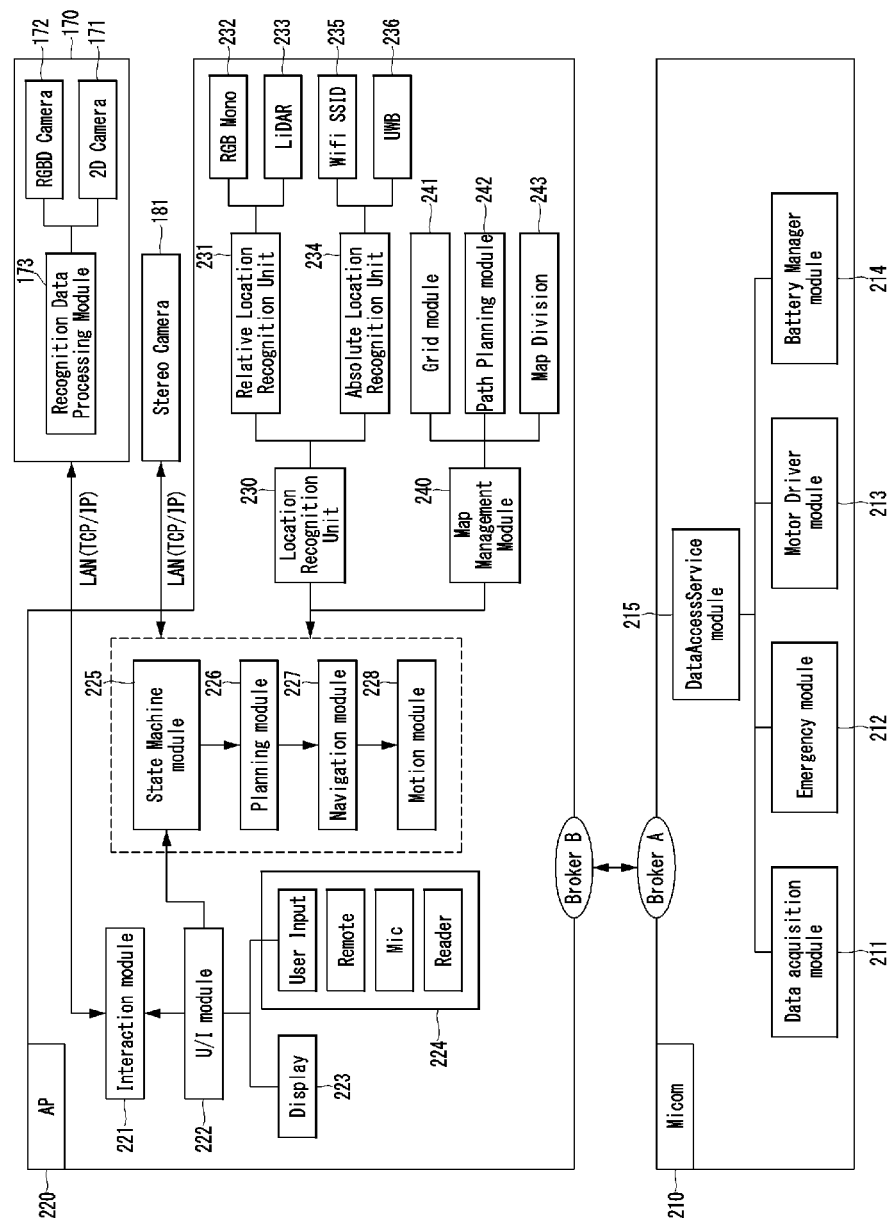
FIG. 10 illustrates in detail configuration of Micom and AP of an artificial intelligence robot device according to another embodiment of the present disclosure.

FIG. 10 illustrates in detail configuration of Micom and AP of an artificial intelligence robot device according to another embodiment of the present disclosure.

As illustrated in FIG. 10, a processor 110 (see FIG. 8) may be implemented in various embodiments in order to control recognition and behaviour of an artificial intelligence robot device 100. The processor 110 (see FIG. 8) may include a Micom 210 and an AP 220. FIG. 10 illustrates that the Micom 210 and the AP 220 are separated from each other. However, the present disclosure is not limited thereto. For example, they may be formed as one body.

For example, the Micom 210 may include a data access service module 215.

The data access service module 215 may include a data acquisition module 211, an emergency module 212, a motor driver module 213, and a battery manager module 214.

The data acquisition module 211 may acquire data sensed by a plurality of sensors included in the artificial intelligence robot device 100 and send the acquired data to the data access service module 215.

The emergency module 212 is a module capable of sensing an abnormal state of the artificial intelligence robot device 100. If the artificial intelligence robot device 100 performs a predetermined type of behaviour, the emergency module 212 may sense that the artificial intelligence robot device 100 has entered an abnormal state.

The motor driver module 213 may manage a drive control of a wheel, a brush, and a suction motor that are used for the travelling and the cleaning of the artificial intelligence robot device 100.

The battery manager module 214 may be responsible for the charging and discharging of the Li-ion battery 122 shown in FIG. 9 and may transfer a battery status of the artificial intelligence robot device 100 to the data access service module 215.

The AP 220 may serve as a controller 110 (see FIG. 8) that receives inputs of various cameras, various sensors, and the airport user and recognizes and processes the inputs to thereby control an operation of the artificial intelligence robot device 100.

An interaction module 221 may be a module that combines recognition data received from the recognition data processing module 173 and an input of the airport user received from a user interface module 222 and oversees software which allows the airport user and the artificial intelligence robot device 100 to interact with each other.

The user interface module 222 may manage an input of the airport user received from a user input unit 224 that receives a near command of the airport user using a display 223, a key, a touch screen, a reader, etc. which is a monitor for a current situation and operation/provision of information of the artificial intelligence robot device 100, or receives a remote signal such as a signal of an IR remote controller for remotely controlling the artificial intelligence robot device 100, or receives an input signal of the airport user from a microphone or a barcode reader, etc.

If at least one input of the airport user is received, the user interface module 222 may send input information of the airport user to a state machine module 225. The state machine module 225 receiving the input information of the airport user may manage the overall state of the artificial intelligence robot device 100 and give appropriate commands corresponding to the input of the airport user.

A planning module 226 may determine start and end time points/behaviors for a specific operation of the artificial intelligence robot device 100 according to a command received from the state machine module 225 and may calculate which path the artificial intelligence robot device 100 should take.

A navigation module 227 is responsible for the overall travel of the artificial intelligence robot device 100 and may cause the artificial intelligence robot device 100 to travel according to a travel path calculated by the planning module 226. A motion module 228 may cause the artificial intelligence robot device 100 to perform other operations in addition to the travelling.

The artificial intelligence robot device 100 according to another embodiment of the present disclosure may include a location recognition unit 230. The location recognition unit 230 may include a relative location recognition unit 231 and an absolute location recognition unit 234.

The relative location recognition unit 231 may correct an amount of movement of the artificial intelligence robot device 100 through an RGM mono sensor 232, calculate an amount of movement of the artificial intelligence robot device 100 for a predetermined time, and recognize a current surrounding environment of the artificial intelligence robot device 100 through a LiDAR 233.

The absolute location recognition unit 234 may include a Wifi SSID 235 and a UWB 236. The WiFi SSID 235 is an UWB sensor module for absolute location recognition of the artificial intelligence robot device 100 and is also a WiFi module for estimating a current location through WiFi SSID detection. The WiFi SSID 235 may analyze a signal strength of WiFi and recognize a location of the artificial intelligence robot device 100. The UWB 236 may calculate a distance between a transmitter and a receiver and sense an absolute location of the artificial intelligence robot device 100.

The artificial intelligence robot device 100 according to another embodiment of the present disclosure may include a map management module 240.

The map management module 240 may include a grid module 241, a path planning module 242, and a map division module 243.

The grid module 241 may manage map data of a surrounding environment for the location recognition previously input to the artificial intelligence robot device 100 on a grid-shaped map or dictionary that the artificial intelligence robot device 100 creates through the SLAM camera.

The path planning module 242 may be responsible to calculate a travel path of the artificial intelligence robot device 100 in the map division for collaboration between the plurality of artificial intelligence robot devices 100.

The path planning module 242 may also calculate a travel path through which the artificial intelligence robot device 100 should move in an environment where one artificial intelligence robot device 100 is operating.

The map division module 243 may calculate in real time a zone for which each of the plurality of artificial intelligence robot devices 100 should be responsible.

Data that is sensed and calculated by the location recognition unit 230 and the map management module 240 may be transmitted again to the state machine module 225. The state machine module 225 may command the planning module 226 to control the operation of the artificial intelligence robot device 100 based on the data that is sensed and calculated by the location recognition unit 230 and the map management module 240.

Various embodiments in which the above-described artificial intelligence robot device 100 is disposed in the airport to accurately recognize or obtain a wake-up word by removing a noise from a user's voice will be described below.

Figure 11:
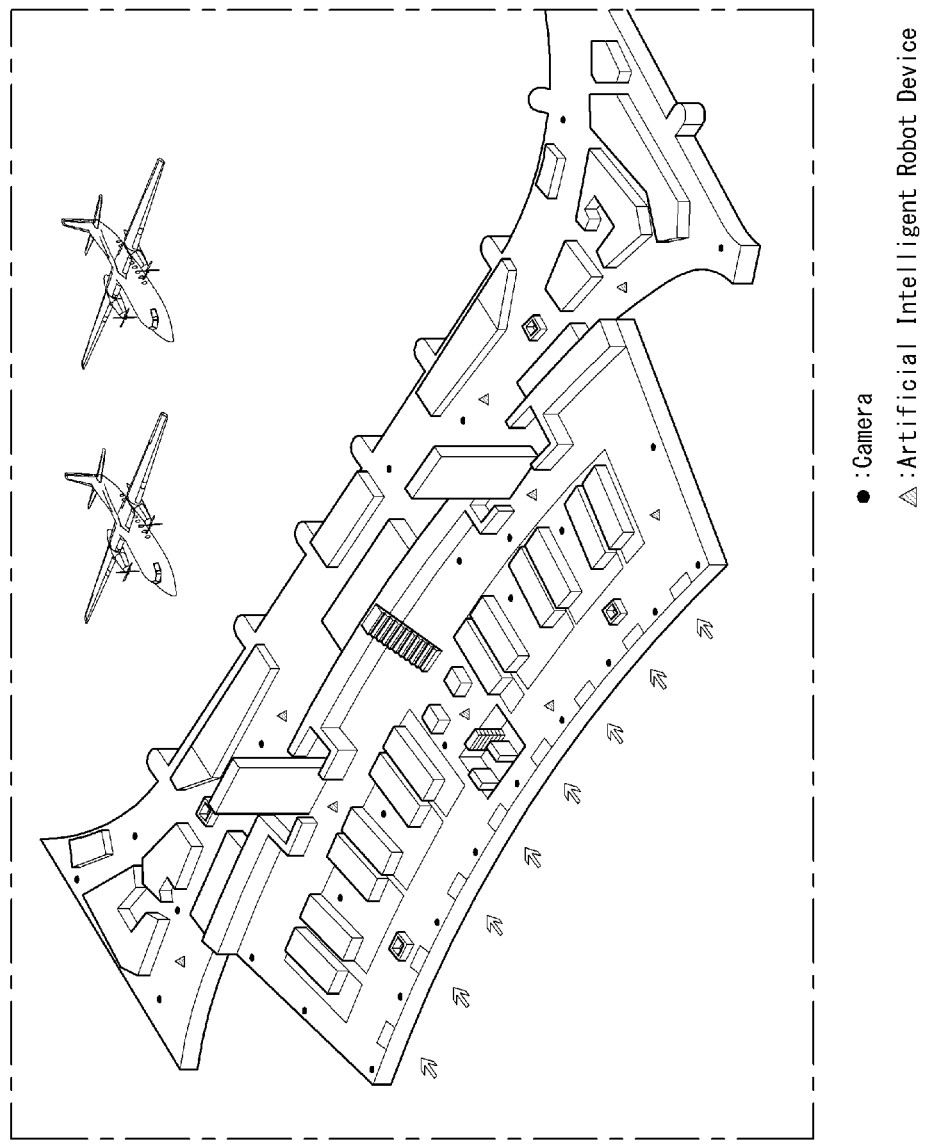
FIG. 11 illustrates a plurality of artificial intelligence robot devices and a plurality of cameras arranged in the airport in accordance with an embodiment of the present disclosure.

FIG. 11 illustrates a plurality of artificial intelligence robot devices and a plurality of cameras arranged in the airport in accordance with an embodiment of the present disclosure.

Referring to FIG. 11, a plurality of artificial intelligence robot devices 100 may be disposed in the airport. Each of the plurality of artificial intelligence robot devices 100 can provide various services including guide, patrol, cleaning, or disinfect, or the like in the airport and can provide a navigation service or various information to customers or airport users. According to an embodiment of the present disclosure, the plurality of artificial intelligence robot devices 100 is dividedly disposed in the zones of the airport and thus can provide more efficiently airport services.

Each artificial intelligence robot device 100 can provide a navigation service while moving to the zone of the airport. For example, an artificial intelligence robot device disposed in a Z zone can provide the navigation service while moving in the Z zone.

A plurality of cameras 400 may also be disposed in the airport. Each of the plurality of cameras 400 may shoot the plurality of artificial intelligence robot devices 100, customer, or airport users in the airport and provide various movement or location services such as their current locations and moving paths.

According to embodiments of the present disclosure, the plurality of cameras 400 is dividedly disposed in the zones of the airport and thus can provide airport services more efficiently and accurately.

Figure 12:
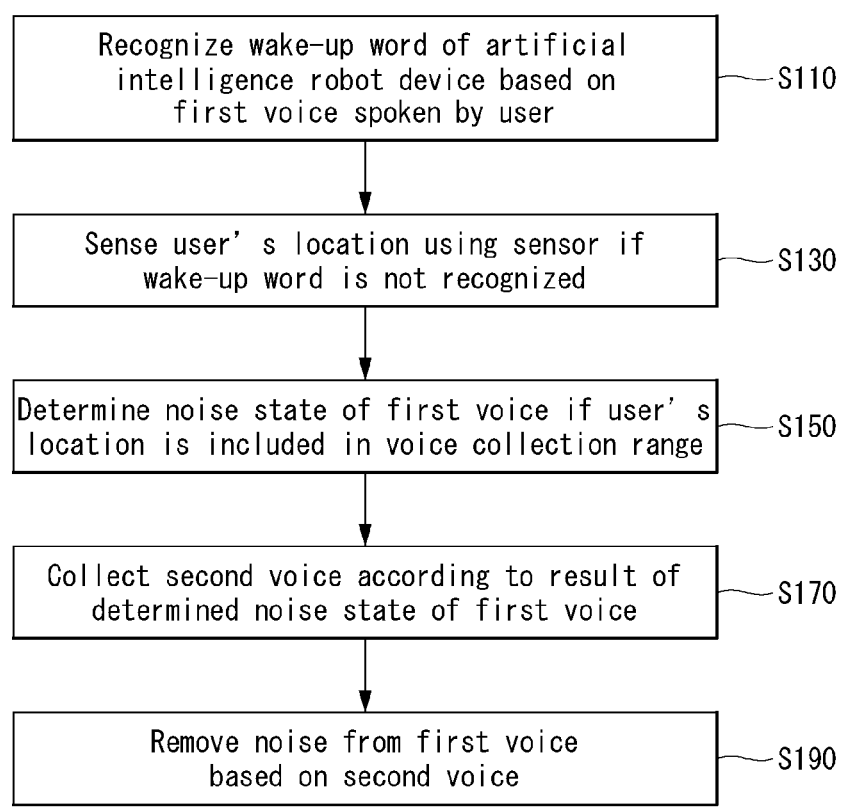
FIG. 12 is a flow chart illustrating a voice recognition method of an artificial intelligence robot device according to an embodiment of the present disclosure.

FIG. 12 is a flow chart illustrating a voice recognition method of an artificial intelligence robot device according to an embodiment of the present disclosure.

A voice recognition method of an artificial intelligence robot device according to an embodiment of the present disclosure may be implemented by an artificial intelligence robot device including functions described with reference to FIGS. 1 to 13 or a server controlling an artificial intelligence robot device.

A processor 110 (see FIG. 8) may recognize a wake-up word of an artificial intelligence robot device based on a first voice spoken by a user in S110. The user may be called an airport user. The processor may collect the spoken first voice and determine whether the wake-up word of the artificial intelligence robot device is recognized based on the collected first voice. If the wake-up word of the artificial intelligence robot device is recognized in the first voice, the processor may be configured to perform an operation of the artificial intelligence robot device corresponding to the recognized wake-up word.

If the wake-up word of the artificial intelligence robot device is not recognized, the processor may sense a user's location using at least one sensor in S130. If the wake-up word of the artificial intelligence robot device is not recognized, the processor may sense the user's location using a sensor and determine whether the sensed user's location is included in a set voice collection range. The processor may sense the user's location using at least one sensor. The at least one sensor may be a location sensor or a direction sensor. For example, the sensor may include an ultrasonic sensor (USS) 132 (see FIG. 9), a location recognition unit 180 (see FIG. 9), etc. The detailed description of the above-described sensors was sufficiently made above, and thus is omitted therein.

If the sensed user's location is not included in the voice collection range, the processor may collect again the spoken first voice and determine whether the wake-up word of the artificial intelligence robot device is recognized based on the collected first voice.

If the sensed user's location is included in the voice collection range, the processor may determine a noise state of the first voice in S150. If the sensed user's location is included in the voice collection range, the processor may learn the first voice and determine a noise state of the first voice based on the learned first voice. If the user is located within the voice collection range, the processor may learn the first voice, generate a learned noise recognition model based on the learned first voice, and determine the noise state of the first voice by applying the first voice to the generated noise recognition model.

The processor may collect a second voice according to a result of the determined noise state of the first voice in S170. If the first voice is included in a predetermined range of the noise recognition model, the processor may collect again and analyze the first voice and recognize or determine the wake-up word of the artificial intelligence robot device in the analyzed first voice.

If the first voice is out of the predetermined range of the noise recognition model, the processor may determine that the wake-up word of the artificial intelligence robot device cannot be recognized in the first voice due to a noise. The processor may collect the second voice in an opposite direction of a direction in which the user is located. The processor may collect the second voice based on the opposite direction of the direction, in which the user is located, and the voice collection range.

The processor may remove a noise from the first voice based on the second voice in S190. The processor may extract a feature value of the noise based on the second voice and compare the extracted feature value with the first voice to obtain the wake-up word.

Figure 13:
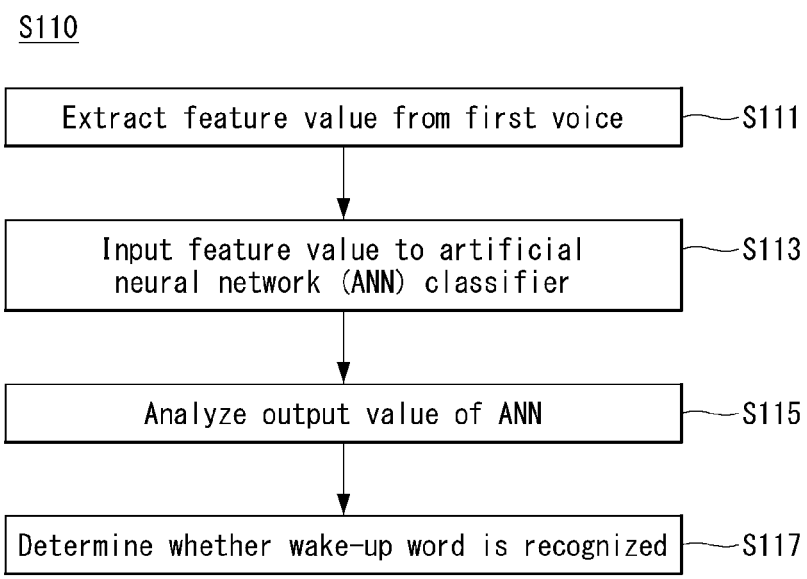
FIG. 13 illustrates an example of determining the recognition of a wake-up word of an artificial intelligence robot device according to an embodiment of the present disclosure.

FIG. 13 illustrates an example of determining the recognition of a wake-up word of an artificial intelligence robot device according to an embodiment of the present disclosure.

Referring to FIG. 13, the processor may extract feature values from a first voice obtained through at least one microphone, in order to determine the recognition of a wake-up word of an artificial intelligence robot device in a voice spoken by an airport user in S111. For example, the processor may receive or collect the first voice of the airport user, who speaks while being located in the airport or moving in the airport, using a microphone included in the artificial intelligence robot device.

The processor may extract the feature value from the first voice of the airport user. The feature value is a value that is determined to indicate in detail whether the wake-up word of the artificial intelligence robot device is recognized among at least one feature capable of being extracted from the voice of the airport user.

The processor may be configured to input the feature values to an artificial neural network (ANN) classifier that is trained to distinguish whether to recognize the wake-up word of the artificial intelligence robot device in S113.

The processor may combine the extracted feature values and generate a wake-up word detection input. The wake-up word detection input may be input to the ANN classifier that is trained to distinguish whether the wake-up word of the artificial intelligence robot device is recognized based on the extracted feature values.

The processor may analyze an output value of an artificial neural network in S115 and determine whether the wake-up word of the artificial intelligence robot device is recognized in the first voice spoken by the airport user based on the output value of the artificial neural network in S117.

FIG. 13 illustrated an example where an operation of identifying the recognition of the wake-up word of the artificial intelligence robot device in the first voice of the airport user through AI processing is implemented in the processing of the artificial intelligence robot device, but the present disclosure is not limited thereto. For example, the AI processing may be performed on a 5G network based on the first voice received from the artificial intelligence robot device.

Figure 14:
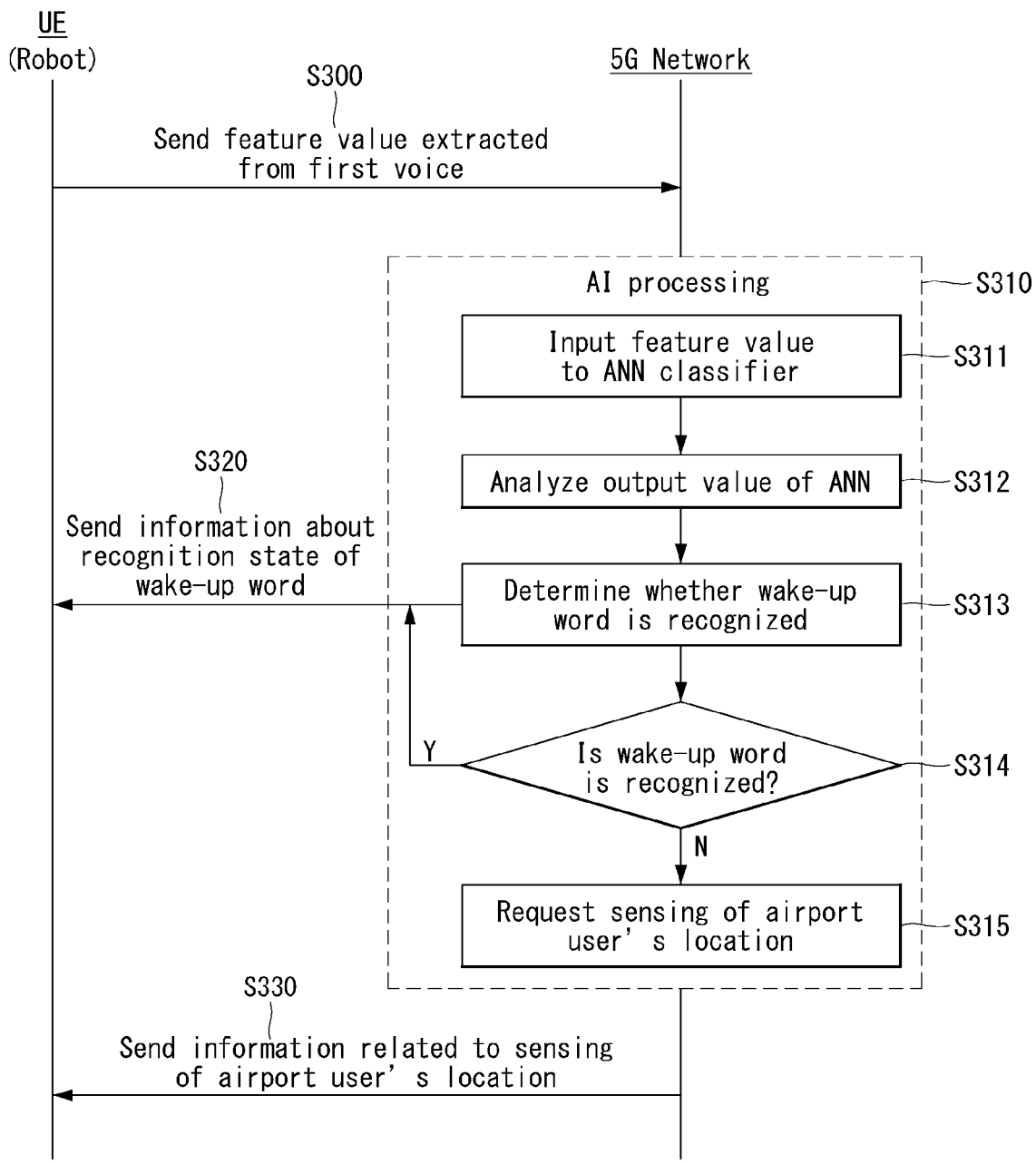
FIG. 14 illustrates another example of determining the recognition of a wake-up word of an artificial intelligence robot device according to an embodiment of the present disclosure.

FIG. 14 illustrates another example of determining the recognition of a wake-up word of an artificial intelligence robot device according to an embodiment of the present disclosure.

The processor may control a transceiver so that a first voice spoken by an airport user is transmitted to an AI processor included in a 5G network. The processor may also control the transceiver so that information AI-processed by the AI processor is received.

The AI-processed information may be information for determining whether a wake-up word of an artificial intelligence robot device is recognized in the first voice of the airport user.

The artificial intelligence robot device may perform an initial access procedure with the 5G network in order to send the first voice spoken by the airport user to the 5G network. The artificial intelligence robot device may perform an initial access procedure with the 5G network based on a synchronization signal block (SSB).

The artificial intelligence robot device may receive, from the network, downlink control information (DCI) that is used to schedule a transmission of the first voice spoken by the airport user collected by at least one microphone included inside the artificial intelligence robot device through the transceiver.

The processor may transmit the first voice spoken by the airport user to the network based on the DCI.

The first voice spoken by the airport user is transmitted to the network via a PUSCH, and the SSB and a DM-RS of the PUSCH may be QCLed for QCL type D.

Referring to FIG. 14, the artificial intelligence robot device may send feature values extracted from a first voice to a 5G network in S300. The first voice may be a voice spoken by the airport user.

Here, the 5G network may include an AI processor or an AI system. The AI system of the 5G network may perform AI processing based on the obtained or received first voice in S310.

The AI system may input the feature values received from the artificial intelligence robot device to an ANN classifier in S311. The AI system may analyze an ANN output value in S312 and determine whether a wake-up word of the artificial intelligence robot device is recognized based on the ANN output value in S313. The 5G network may send, to the artificial intelligence robot device, information about whether to recognize the wake-up word of the artificial intelligence robot device determined by the AI system through a transceiver in S320.

Here, the information about whether to recognize the wake-up word of the artificial intelligence robot device may include whether the wake-up word of the artificial intelligence robot device is recognized or not.

If the AI system determines that the wake-up word of the artificial intelligence robot device has been recognized in S314, the AI system may be configured to perform an operation of the artificial intelligence robot device corresponding to the recognized wake-up word.

If the AI system determines that the wake-up word of the artificial intelligence robot device has not been recognized in S314, the AI system may request to sense an airport user's location using a sensor in S315. Further, the AI system may send, to the artificial intelligence robot device, information (or signal) requesting to sense the airport user's location in S330.

The artificial intelligence robot device may transmit the first voice of the airport user to the 5G network and extract a feature value corresponding to a wake-up word detection input to be used as an input of an artificial neural network for determining whether the wake-up word of the artificial intelligence robot device is recognized from the first voice in the AI system included in the 5G network.

Figure 15:
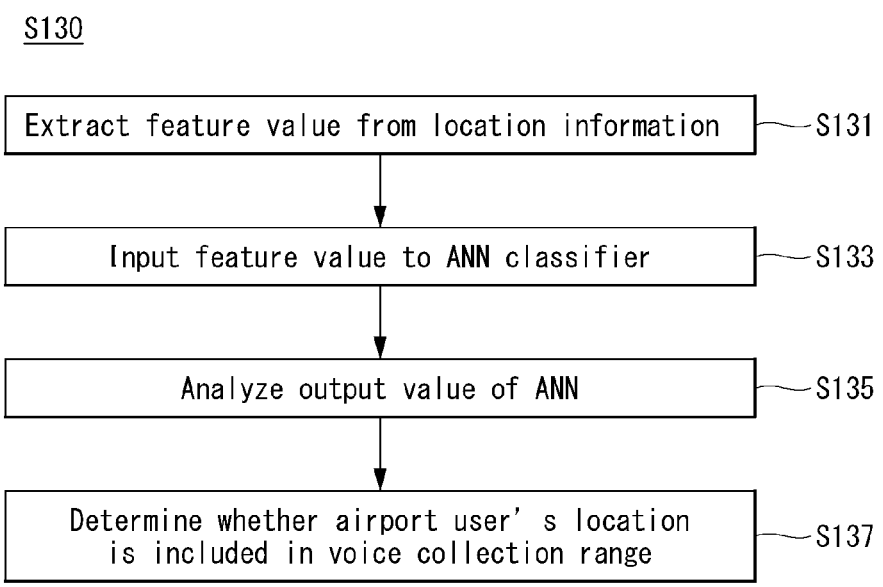
FIG. 15 illustrates an example of determining a user's location using an artificial intelligence robot device according to an embodiment of the present disclosure.

FIG. 15 illustrates an example of determining a user's location using an artificial intelligence robot device according to an embodiment of the present disclosure.

Referring to FIG. 15, the processor may extract feature values from location information obtained through at least one sensor in order to determine an airport user's location in S131. For example, the processor may sense a location of an airport user located in the airport using a sensor included in the artificial intelligence robot device.

The processor may extract the feature values from the airport user's location. The feature value is a value that is determined to indicate in detail whether the airport user's location is included in a voice collection range among at least one feature capable of being extracted from the airport user's location.

The processor may be configured to input the feature values to an artificial neural network (ANN) classifier that is trained to distinguish whether the airport user's location is included in the voice collection range in S133.

The processor may combine the extracted feature values and generate a location detection input. The location detection input may be input to the ANN classifier that is trained to distinguish whether the airport user's location is included in the voice collection range based on the extracted feature value.

The processor may analyze an output value of an artificial neural network in S135 and determine whether the airport user's location is included in the voice collection range based on the output value of the artificial neural network in S137.

FIG. 15 illustrated an example where an operation of identifying whether the airport user's location is included in the voice collection range through AI processing is implemented in the processing of the artificial intelligence robot device, but the present disclosure is not limited thereto. For example, the AI processing may be performed on a 5G network based on the airport user's location received from the artificial intelligence robot device.

Figure 16:
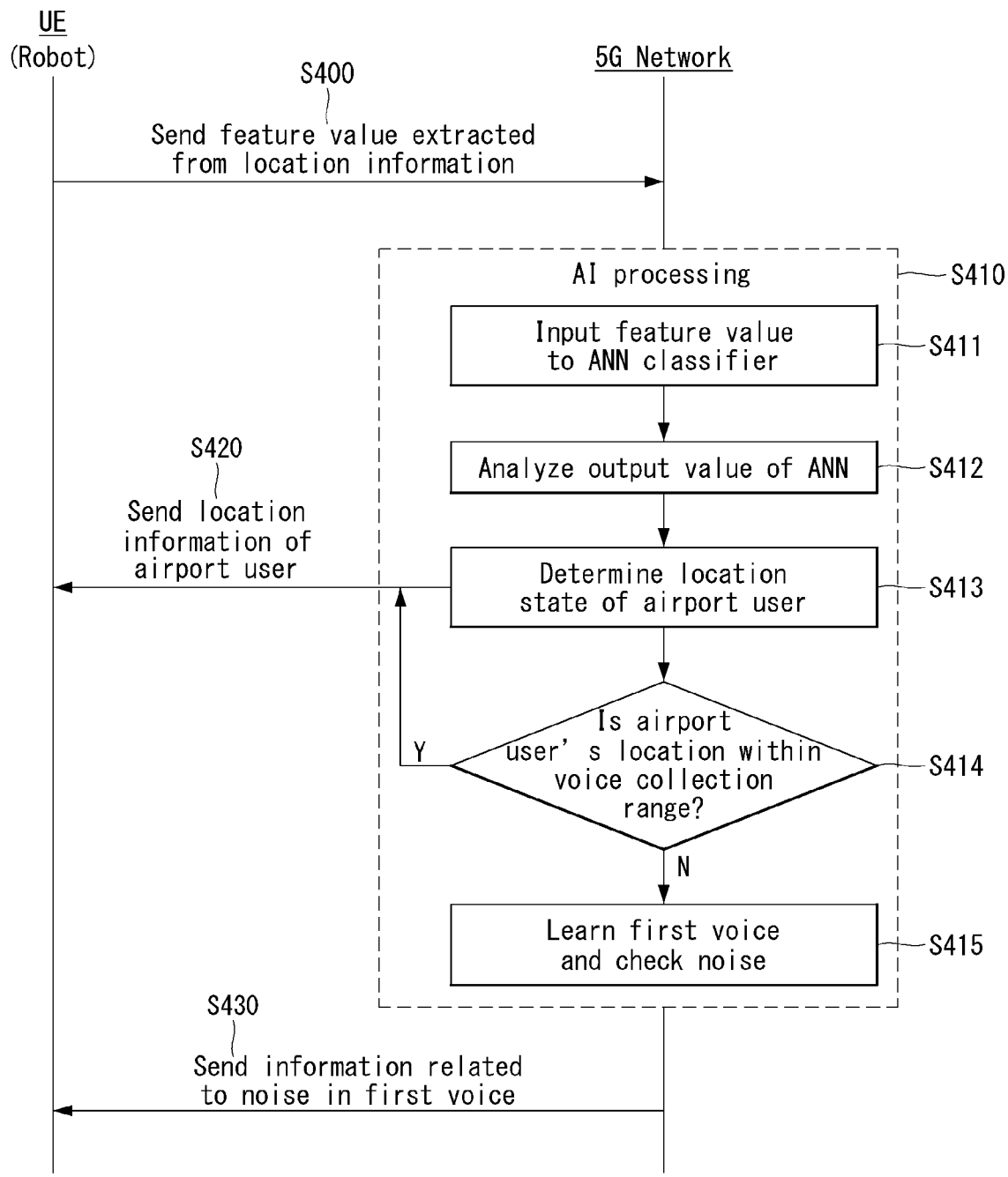
FIG. 16 illustrates another example of determining a user's location using an artificial intelligence robot device according to an embodiment of the present disclosure.

FIG. 16 illustrates another example of determining a user's location using an artificial intelligence robot device according to an embodiment of the present disclosure.

The processor may control a transceiver so that information about an airport user's location is transmitted to an AI processor included in a 5G network. The processor may also control the transceiver so that information AI-processed by the AI processor is received.

The AI-processed information may be information for determining whether the airport user's location is included in a voice collection range.

The artificial intelligence robot device may perform an initial access procedure with the 5G network in order to send location information of the airport user to the 5G network. The artificial intelligence robot device may perform an initial access procedure with the 5G network based on a synchronization signal block (SSB).

The artificial intelligence robot device may receive, from the network, downlink control information (DCI) that is used to schedule a transmission of the location information of the airport user collected by at least one location sensor or direction sensor included inside the artificial intelligence robot device through the transceiver.

The processor may send the location information of the airport user to the network based on the DCI.

The location information of the airport user is transmitted to the network via a PUSCH, and the SSB and a DM-RS of the PUSCH may be QCLed for QCL type D.

Referring to FIG. 16, the artificial intelligence robot device may send feature values extracted from location information of an airport user to a 5G network in S400.

Here, the 5G network may include an AI processor or an AI system. The AI system of the 5G network may perform AI processing based on the obtained or received location information of the airport user in S410.

The AI system may input the feature values received from the artificial intelligence robot device to an ANN classifier in S411. The AI system may analyze an ANN output value in S412 and determine a state of an airport user's location based on the ANN output value in S413. The 5G network may send information about the state of the airport user's location determined by the AI system to the artificial intelligence robot device through a transceiver in S420.

Here, the information about the state of the airport user's location may include whether the airport user's location is included in a voice collection range.

If the AI system determines that the airport user's location is out of the voice collection range in S414, the AI system may collect again a first voice spoken by the airport user through a microphone. Afterwards, the AI system may determine whether to recognize a wake-up word of the artificial intelligence robot device based on the first voice.

If the AI system determines that the airport user's location is included in the voice collection range in S414, the AI system may learn the first voice and check a noise in the learned first voice in S415. Further, the AI system may send information (or signal) related to the noise in the first voice to the artificial intelligence robot device in S430.

The artificial intelligence robot device may transmit the airport user's location to the 5G network and extract a feature value corresponding to a location detection input to be used as an input of an artificial neural network for determining whether the airport user's location is included in the voice collection range in the AI system included in the 5G network.

Figure 17:
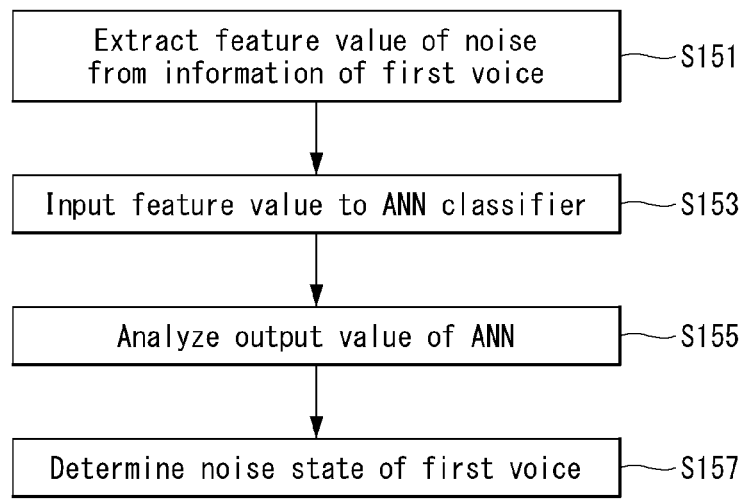
FIG. 17 illustrates an example of determining a noise state of a first voice through an artificial intelligence robot device according to an embodiment of the present disclosure.

FIG. 17 illustrates an example of determining a noise state of a first voice through an artificial intelligence robot device according to an embodiment of the present disclosure.

Referring to FIG. 17, if an airport user is included in a voice collection range, the processor may extract feature values of a noise from information of a first voice previously obtained through at least one microphone in order to determine a collected noise state of the first voice in S151.

The processor may extract the feature value of the noise from the first voice of the airport user. The feature value of the noise is a value that is determined to indicate in detail the noise state of the first voice among at least one feature capable of being extracted from the airport user's voice.

The processor may be configured to input the feature values to an artificial neural network (ANN) classifier that is trained to distinguish the noise state based on the feature values of the noise in S153.

The processor may combine the extracted feature values of the noise and generate a noise detection input. The noise detection may be input to the ANN classifier that is trained to distinguish the noise state of the first voice based on the extracted feature value of the noise.

The processor may analyze an output value of an artificial neural network in S155 and determine the noise state in the first voice spoken by the airport user based on the output value of the artificial neural network in S157.

FIG. 17 illustrated an example where an operation of identifying the noise state in the first voice of the airport user through AI processing is implemented in the processing of the artificial intelligence robot device, but the present disclosure is not limited thereto. For example, the AI processing may be performed on a 5G network based on the first voice received from the artificial intelligence robot device.

Figure 18:
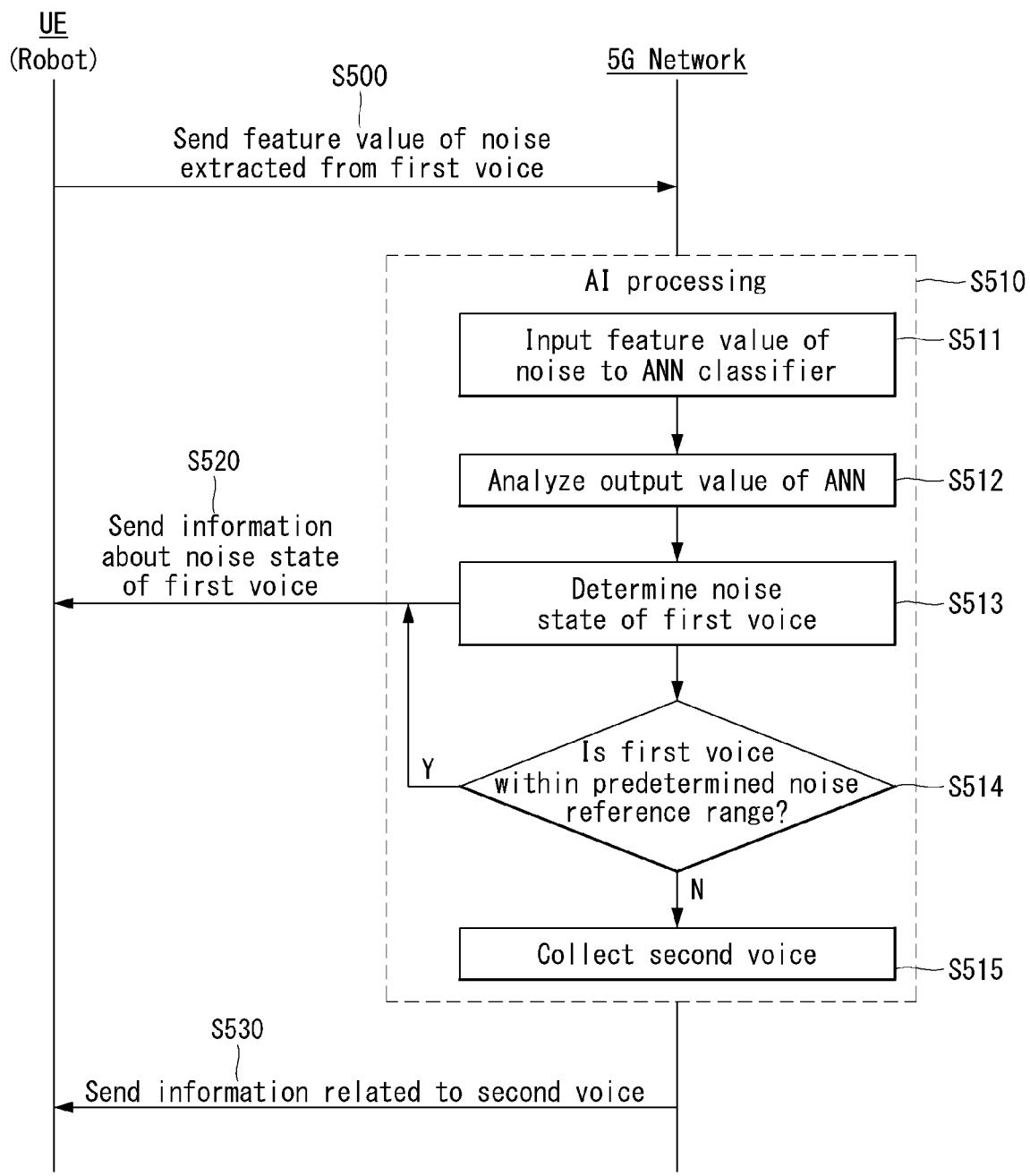
FIG. 18 illustrates another example of determining a noise state of a first voice through an artificial intelligence robot device according to an embodiment of the present disclosure.

FIG. 18 illustrates another example of determining a noise state of a first voice through an artificial intelligence robot device according to an embodiment of the present disclosure.

The processor may control a transceiver so that a first voice spoken by an airport user is transmitted to an AI processor included in a 5G network. The processor may also control the transceiver so that information AI-processed by the AI processor is received.

The AI-processed information may be information for determining a noise state of the first voice of the airport user.

The artificial intelligence robot device may perform an initial access procedure with the 5G network in order to send the first voice spoken by the airport user to the 5G network. The artificial intelligence robot device may perform an initial access procedure with the 5G network based on a synchronization signal block (SSB).

The artificial intelligence robot device may receive, from the network, downlink control information (DCI) that is used to schedule a transmission of the first voice spoken by the airport user collected by at least one microphone included inside the artificial intelligence robot device through the transceiver.

The processor may send the first voice spoken by the airport user to the network based on the DCI.

The first voice spoken by the airport user is transmitted to the network via a PUSCH, and the SSB and a DM-RS of the PUSCH may be QCLed for QCL type D.

Referring to FIG. 18, the artificial intelligence robot device may send feature values of a noise extracted from a first voice to a 5G network in S500. The first voice may be a voice spoken by the airport user.

Here, the 5G network may include an AI processor or an AI system. The AI system of the 5G network may perform AI processing based on the obtained or received first voice in S510.

The AI system may input the feature values received from the artificial intelligence robot device to an ANN classifier in S511. The AI system may analyze an ANN output value in S512 and determine a noise state of the first voice based on the ANN output value in S513. The 5G network may send information about the noise state of the first voice determined by the AI system to the artificial intelligence robot device through a transceiver in S520.

Here, the information about the noise state of the first voice may include whether the noise of the first voice is out of a predetermined noise reference range, and whether the noise of the first voice is in a normal state included in the predetermined noise reference range. The noise reference range may be a frequency bandwidth generated by learning and analyzing the first voice, the second voice, etc. that are previously collected.

If the AI system determines that the first voice is in the normal state in S514, the AI system may be configured to perform an operation of the artificial intelligence robot device corresponding to the normal state of the first voice in S520.

If the AI system determines that the first voice is in the noise state in S514, the AI system may collect a second voice in an opposite direction of a direction in which the airport user is located, using other microphone in S515. Further, the AI system may send, to the artificial intelligence robot device, information (or signal) related to the second voice collected using the other microphone in S530.

The artificial intelligence robot device may transmit the first voice of the airport user to the 5G network and extract a feature value of the noise corresponding to a noise detection input to be used as an input of an artificial neural network for determining the noise state of the first voice in the AI system included in the 5G network.

Figure 19:
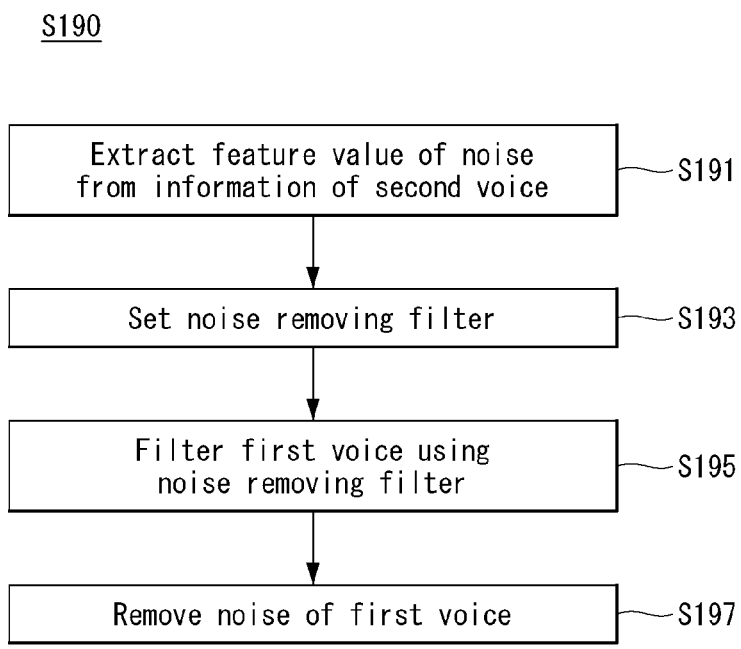
FIG. 19 illustrates an example of removing a noise of a first voice based on a second voice of an artificial intelligence robot device according to an embodiment of the present disclosure.

FIG. 19 illustrates an example of removing a noise of a first voice based on a second voice of an artificial intelligence robot device according to an embodiment of the present disclosure.

Referring to FIG. 19, the processor may collect a second voice according to a result of a noise state of a first voice.

If the processor determines that the first voice is in a noise state, the processor may be configured to collect the second voice through other microphone. The other microphone may be located in an opposite direction of a first microphone collecting the first voice. For example, if a microphone is disposed toward a front surface or the front of an artificial intelligence robot device, the other microphone may be disposed toward a rear surface or the rear of the artificial intelligence robot device.

The microphone may be called a first microphone, and the other microphone may be called a second microphone. The first microphone may collect the first voice generated in the front of the artificial intelligence robot device. For example, the first microphone may collect the first voice if an airport user is located in front of the artificial intelligence robot device and is located in a voice collection range. The second microphone may collect the second voice generated in the rear of the artificial intelligence robot device. For example, the second microphone may collect the second voice if the airport user is located in the rear of the artificial intelligence robot device and is located in the voice collection range. The voice collection range will be described later.

The processor may extract a feature value of a noise based on the collected second voice in S191. The processor may set a noise removing filter based on the feature value of the noise extracted from the collected second voice in S193. For example, the noise removing filter may be represented by a frequency band.

The processor may compare the set noise removing filter with the first voice. More specifically, the processor may compare the set noise removing filter with the first voice and remove a frequency band, that substantially overlaps the noise removing filter, from the first voice in S195. The processor may remove a noise included in the first voice by filtering the first voice using the noise removing filter in S197.

Figure 20:
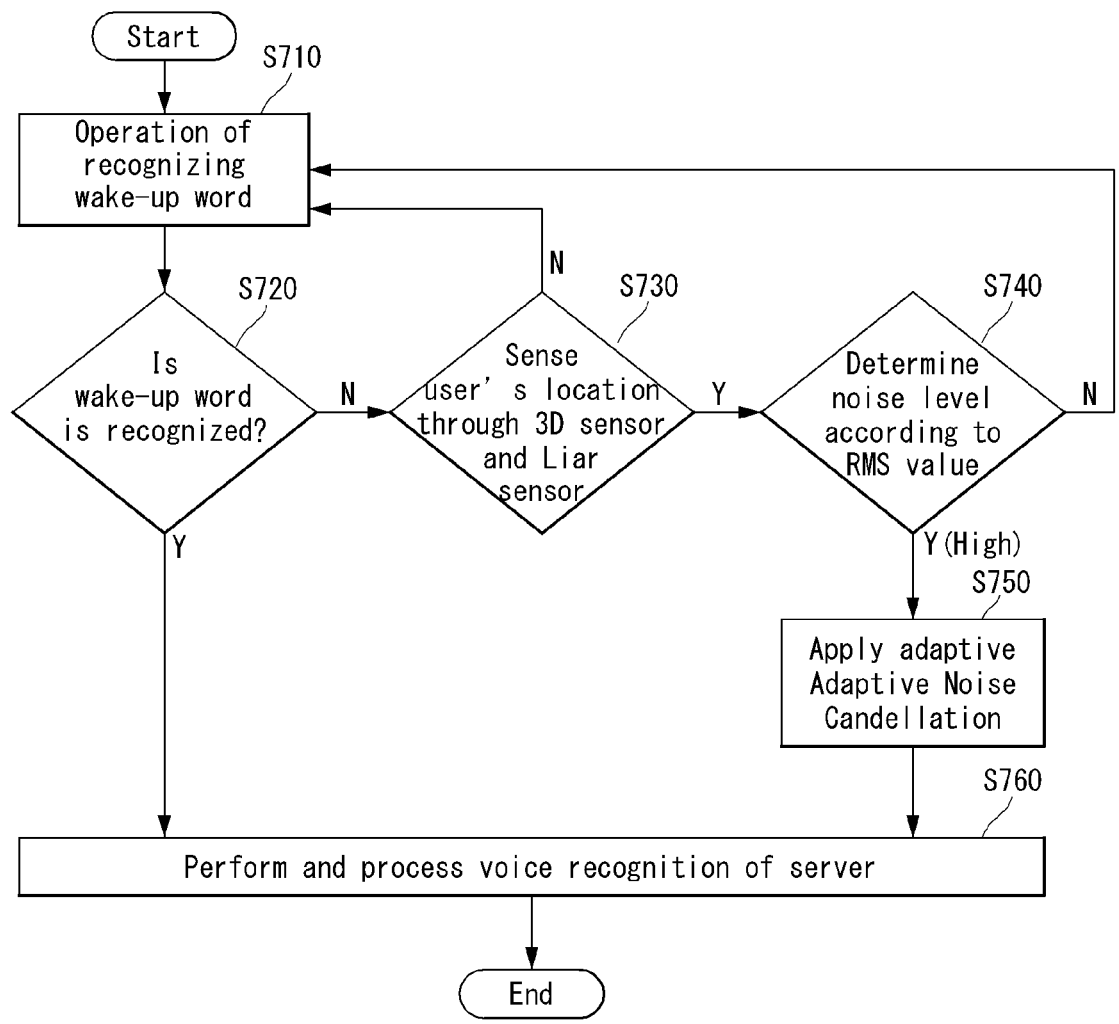
FIG. 20 illustrates a voice recognition method of an artificial intelligence robot device according to an embodiment of the present disclosure.
Figure 21:
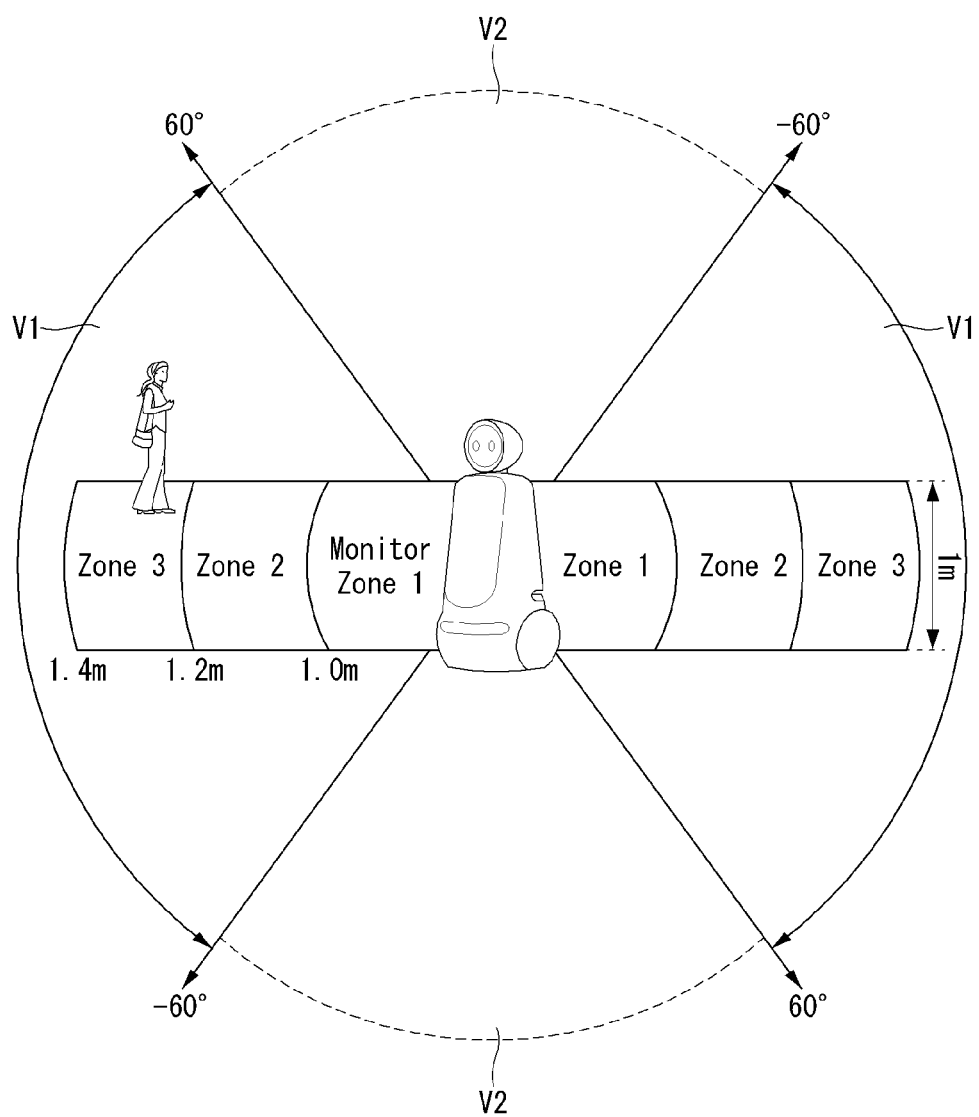
FIG. 21 illustrates setting of a voice collection range using an artificial intelligence robot device according to an embodiment of the present disclosure.
Figure 22:
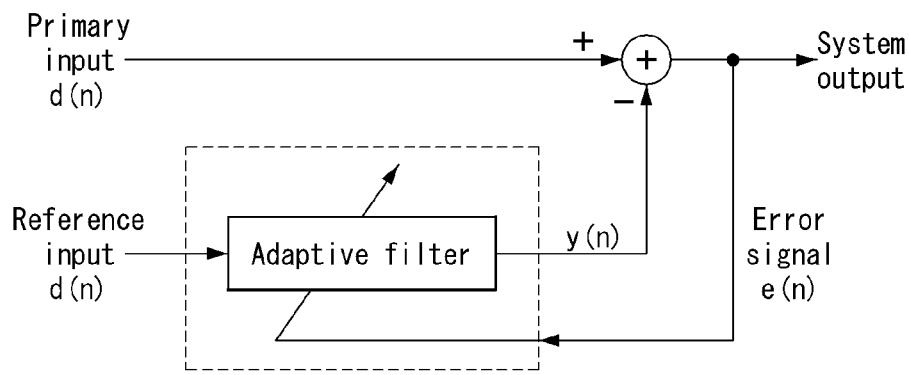
FIG. 22 illustrates removing a noise from a first voice using an artificial intelligence robot device according to an embodiment of the present disclosure.

FIG. 20 illustrates a voice recognition method of an artificial intelligence robot device according to an embodiment of the present disclosure. FIG. 21 illustrates setting of a voice collection range using an artificial intelligence robot device according to an embodiment of the present disclosure. FIG. 22 illustrates removing a noise from a first voice using an artificial intelligence robot device according to an embodiment of the present disclosure.

Referring to FIG. 20, an artificial intelligence robot device may collect a first voice spoken by an airport user using at least one sensor while patrolling the airport under the control of a processor in S710. The first voice is a voice spoken by the airport user and may include a wake-up word capable of operating the artificial intelligence robot device. For example, the first voice may include a wake-up word and a noise around the airport. The processor may be configured to recognize the wake-up word by collecting the first voice using at least one sensor.

At least one sensor may include a microphone. For example, the microphone may be mounted on each of a front surface and a rear surface of the artificial intelligence robot device.

The artificial intelligence robot device may determine whether to recognize the wake-up word in the first voice collected under the control of the processor in S720. The artificial intelligence robot device may perform an operation corresponding to the wake-up word if the wake-up word is normally recognized in the first voice spoken by the airport user under the control of the processor in S760.

For example, if the wake-up word includes "Hi robot, tell me a place for airline ticketing", the artificial intelligence robot device may analyze the wake-up word recognized under the control of the processor and provide the airport user with the place for airline ticketing through a display or a speaker according to a result of learned AI processing. Alternatively, if the place for airline ticketing is included in an area handled by the artificial intelligence robot device under the control of the processor, the artificial intelligence robot device may escort directly the airport user and guide the airport user to the ticketing place.

On the contrary, if the wake-up word is abnormally recognized in the first voice spoken by the airport user under the control of the processor, the artificial intelligence robot device may operate to sense a location of the airport user speaking the wake-up word.

The artificial intelligence robot device may sense a direction and a location of the airport user using a location sensor or a direction sensor, etc. in S730. For example, the location sensor or the direction sensor may be a 3D sensor and a Liar sensor. Since this was sufficiently described above, a description thereof is omitted.

The artificial intelligence robot device may determine whether the sensed location of the airport user is included in a voice collection range. The voice collection range, as illustrated in FIG. 21, may be set around the artificial intelligence robot device.

The artificial intelligence robot device may form a circular zone having a radius of approximately 5 meters around the artificial intelligence robot device. The circular zone may have a voice collection range V1 and a voice non-collection range V2. The voice collection range V1 may be defined as an area or a range capable of collecting a voice spoken by the airport user. The voice non-collection range V2 may be defined as an area or a range not capable of collecting a voice spoken by the airport user.

The voice collection range V1 may have an angle of a circle of 120 degrees with respect to the artificial intelligence robot device that faces the front or the rear. If a horizontal direction (or front-rear direction) with respect to the artificial intelligence robot device is assumed to be a reference line, the voice collection range V1 may have an angle of a circle of approximately 120 degrees including an angle of a circle of +60 degrees and an angle of a circle of −60 degrees.

The voice non-collection range V2 may be an area or a range excluding the voice collection range V1 from the circular zone.

The voice collection range V1 may set at least one collection zone depending on a separation distance. For example, at least one collection zone may include first to third collection zones.

The first collection zone may be separated from the front or the rear of the artificial intelligence robot device by approximately 1 meter and may have an area of approximately 1 meter in a left-right direction. The second collection zone may be separated from the front or the rear of the artificial intelligence robot device by approximately 1.2 meter from an end line of the first collection zone and may have an area of approximately 1 meter in the left-right direction. The third collection zone may be separated from the front or the rear of the artificial intelligence robot device by approximately 1.4 meter from an end line of the second collection zone and may have an area of approximately 1 meter in the left-right direction.

If it is determined that a sensed location of the airport user is out of the voice collection range V1 or is within the voice non-collection range V2, the artificial intelligence robot device may collect a first voice spoken by the airport user using at least one sensor while continuing to patrol the airport under the control of the processor.

If it is determined that a sensed location of the airport user is included in the voice collection range V1, the artificial intelligence robot device may learn the first voice and check a noise in the learned first voice. That is, the artificial intelligence robot device may determine whether the first voice is a noise removing target, in which a noise needs to be removed, through the airport user's location.

If it is determined that the first voice collected by a result value of the airport user's location is a noise removing target, the artificial intelligence robot device may learn the first voice and check a noise state in the learned first voice.

The artificial intelligence robot device may extract a feature value of the noise from the learned first voice. The feature value of the noise may include various sounds or noises that may be generated in the airport. For example, the feature value of the noise may include internal announcements of the airport, cleaner sounds to clean the airport, engine sounds of airplanes taking off and landing outside the airport, airport cart sounds running inside the airport, and wheel sounds of carriers moving inside the airport, etc.

The artificial intelligence robot device may analyze the extracted feature value of the noise and determine a noise level according to a root mean square (RMS) value in S740. The RMS may be defined as the square root of the mean of the squares of an instantaneous value of a waveform signal for the first voice. That is, the RMS may represent successive outputs of an amplifier, and basic amplification ability may be improved as a value of the output increases.

The artificial intelligence robot device may compare a RMS value of the first voice collected or obtained through a front microphone with a predetermine threshold value and learn an environment analysis. The threshold value may be set by learning the first voice, the second voice, a RMS value of the first voice, and a RMS value of the second voice.

If it is determined that the learned first voice is less than the predetermine threshold value, the artificial intelligence robot device may collect the first voice spoken by the airport user using at least one sensor while continuing to patrol the airport under the control of the processor. That is, if the learned first voice is less than the predetermine threshold value, the artificial intelligence robot device can sufficiently recognize a wake-up word spoken by the airport user even if there is a noise in the first voice.

If it is determined that the learned first voice is greater than the predetermine threshold value, the artificial intelligence robot device may collect a second voice using other microphone. The other microphone may be mounted toward the rear of the artificial intelligence robot device and collect the second voice from the rear of the artificial intelligence robot device. The second voice may be a sound not including the wake-up word spoken by the airport user.

The artificial intelligence robot device may extract a feature value of a noise from the collected second voice and set a noise reference range based on the extracted feature value. The artificial intelligence robot device may remove the noise of the first voice by applying the first voice to the noise reference range set based on the second voice.

The artificial intelligence robot device may remove the noise using an adaptive noise cancellation algorithm in S750. The artificial intelligence robot device can secure a wake-up word with clear sound quality, in which a noise is removed, by subtracting the second voice collected through other microphone from the first voice input through a microphone using the adaptive noise cancellation algorithm.

As illustrated in FIG. 22, a first voice may be an ambient background noise and a wake-up word (i.e., primary input) d(n) that is a voice of an airport user, and a second voice may be defined as a pure noise (i.e., reference input) u(n) that is an ambient background noise excluding the wake-up word.

It is preferable that a wake-up word voice spoken by the airport user is not introduced into the second voice that is a reference input signal, so that the artificial intelligence robot device applies an efficient ANC algorithm. Hence, if the artificial intelligence robot device senses the airport user through a location sensor or a direction sensor, etc., the artificial intelligence robot device may detect a direction of the airport user and determine whether to perform the adaptation through the corresponding direction detection, in order to prevent the wake-up word voice spoken by the airport user from being introduced. The corresponding direction detection may find the power of incoming sound by means of direction information obtained by a sensor, etc. using a steered response power phase transform (SRP-PHAT).

The artificial intelligence robot device may find a location of an airport user, who is assumed to speak a wake-up word, and assume a location of the wake-up word by applying a SRP-PHAT algorithm only to the airport user's location. That is, the artificial intelligence robot device may determine the airport user's location by reducing a target space that should be searched, and reduce an amount of calculation by applying the SRP-PHAT algorithm only to the airport user's location.

Further, if the wake-up word spoken by the airport user is introduced into the second voice that is the basis of a noise reference range, the artificial intelligence robot device may remove previously the wake-up word so that the wake-up word is not updated to the noise reference range.

The artificial intelligence robot device may set an adaptive filter that is the noise reference range based on the second voice, remove an output signal y(n) of the set adaptive filter in the first voice, and again apply an error signal therefor to the adaptive filter, thereby minimizing a square error of the output signal y(n). Due to such an operation, the artificial intelligence robot device can secure a wake-up word with clear sound quality, in which a noise is removed, from the first voice.

Afterwards, the artificial intelligence robot device may normally recognize the wake-up word in the first voice spoken by the airport user under the control of the processor and perform an operation corresponding to the recognized wake-up word in S760.

Figure 23:
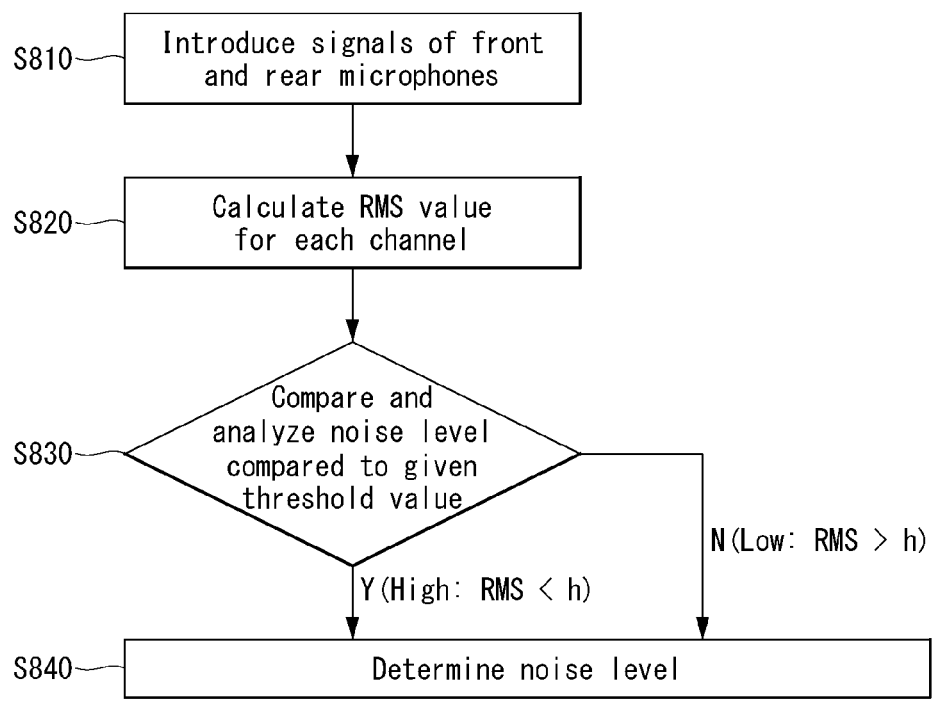
FIG. 23 illustrates a method of determining a noise level using an artificial intelligence robot device according to an embodiment of the present disclosure.

FIG. 23 illustrates a method of determining a noise level using an artificial intelligence robot device according to an embodiment of the present disclosure.

Referring to FIG. 23, the artificial intelligence robot device may introduce or collect a first voice using a front microphone and introduce or collect a second voice using a rear microphone in S810. The artificial intelligence robot device may simultaneously or sequentially collect the first voice and the second voice according to an environment around the airport.

The artificial intelligence robot device may calculate a RMS value of the first voice collected by the front microphone and calculate a RMS value of the second voice collected by the rear microphone under the control of the processor in S820. The artificial intelligence robot device may calculate and analyze the RMS value of the first voice and the RMS value of the second voice for each channel of the front and rear microphones under the control of the processor in S830.

The artificial intelligence robot device may compare each of the RMS value of the first voice and the RMS value of the second voice with a predetermined threshold value and compare and analyze a noise level.

If each of the RMS value of the first voice and the RMS value of the second voice is greater than the predetermined threshold value, the artificial intelligence robot device may determine the noise level as a high level in S840. Further, if each of the RMS value of the first voice and the RMS value of the second voice is less than the predetermined threshold value, the artificial intelligence robot device may determine the noise level as a low level in S840.

The artificial intelligence robot device may apply the determined noise level to the predetermined threshold value and upgrade the threshold value. Hence, because the artificial intelligence robot device can differently set a threshold value depending on a noise of an environment around the airport, the artificial intelligence robot device can efficiently recognize a wake-up word of the airport user regardless of the noise of the environment around the airport.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A voice recognition method for an artificial intelligence robot device, comprising:
    collecting first audio including a voice of a user and determining whether a wake-up word of the artificial intelligence robot device is recognized based on the collected first audio;
    based on the wake-up word not being recognized, sensing a location of the user and determining whether the sensed location of the user is included in a set voice collection range;
    based on the location of the user being included in the set voice collection range, determining a noise state of the first audio;

collecting second audio from an opposite direction of the location of the user according to a result of the determined noise state of the first audio; and extracting a feature value of a noise based on the second audio and removing the extracted feature value of the noise from the first audio to obtain the wake-up word from the first audio.

2. The voice recognition method of claim 1, wherein the first audio is collected using a first microphone mounted toward a front of the artificial intelligence robot device.

3. The voice recognition method of claim 1, wherein determining whether the wake-up word of the artificial intelligence robot device is recognized based on the collected first audio comprises:

extracting first feature values from the first audio;

inputting the first feature values to an artificial neural network (ANN) trained to recognize the wake-up word; and determining whether the wake-up word of the artificial intelligence robot device is recognized based on an output of the artificial neural network (ANN).

4. The voice recognition method of claim 3, wherein the first feature values are values capable of distinguishing whether the wake-up word of the artificial intelligence robot device is recognized.

5. The voice recognition method of claim 3, wherein determining whether the location of the user is included in the set voice collection range comprises:

extracting second feature values from sensor information related to the location of the user;

inputting the second feature values to a second ANN trained to distinguish whether the location of the user is included in the set voice collection range; and determining whether the location of the user is included in the set voice collection range based on an output of the second ANN.

6. The voice recognition method of claim 5, wherein the second feature values are values capable of distinguishing whether the location of the user is included in the set voice collection range.

7. The voice recognition method of claim 5, wherein determining of the noise state of the first audio comprises:

extracting third feature values of the noise from the first audio;

inputting the third feature values of the noise to a third ANN trained to distinguish noise states of inputted audio; and determining the noise state of the first audio based on an output of the third ANN.

8. The voice recognition method of claim 7, wherein the third feature values of the noise are values capable of distinguishing the noise state of the first audio.

9. The voice recognition method of claim 1, wherein the second audio is collected using a second microphone mounted toward a rear of the artificial intelligence robot device.

10. The voice recognition method of claim 7, further comprising receiving, from a network, downlink control information (DCI) that is used to schedule a transmission of the first audio or the location information, wherein the first audio or the location information is transmitted to the network based on the DCI.

11. The voice recognition method of claim 10, further comprising performing an initial access procedure with the network based on a synchronization signal block (SSB), wherein the first audio or the location information is transmitted to the network via a physical uplink shared channel (PUSCH), and wherein the SSB and a demodulation reference signal (DM-RS) of the PUSCH are quasi co-located (QCLed) for QCL type D.

12. The voice recognition method of claim 11, further comprising:

controlling a transceiver so that the first audio or the location information is transmitted to an AI processor included in the network;

receiving information processed by the AI processor via the transceiver, wherein the processed information is one of information for determining a recognition state of the wake-up word of the artificial intelligence robot device, information for determining whether the location of the user is included in the set voice collection range, or information for determining the noise state of the first audio.

13. The voice recognition method of claim 1, wherein the first audio includes a wake-up word spoken by the user at an airport and a noise around the airport, wherein the second audio includes the noise around the airport.

14. The voice recognition method of claim 1, wherein the feature value of the noise is extracted based on an announcement of the airport, a sound of a cleaner cleaning the airport, a sound of an airplane, a sound of an airport cart, or a sound of carriers moving inside the airport.

15. The voice recognition method of claim 1, wherein obtaining the wake-up word from the first audio comprises:

setting a noise reference range based on the extracted feature value of the noise based on the second audio; and applying the set noise reference range to the first audio to remove the noise from the first audio to obtain the wake-up word.

16. A machine-readable non-transitory medium having stored thereon machine-executable instructions for a voice recognition method for an artificial intelligence robot device, the instructions comprising:

collecting first audio including a voice of a user and determining whether a wake-up word of the artificial intelligence robot device is recognized based on the collected first audio;

based on the wake-up word not being recognized, sensing a location of the user and determining whether the sensed location of the user is included in a set voice collection range;

based on the location of the user being included in the set voice collection range, determining a noise state of the first audio;

collecting second audio from an opposite direction of the location of the user according to a result of the determined noise state of the first audio; and extracting a feature value of a noise based on the second audio and removing the extracted feature value of the noise from the first audio to obtain the wake-up word from the first audio.

17. The machine-readable non-transitory medium of claim 16, wherein determining whether the wake-up word of the artificial intelligence robot device is recognized based on the collected first audio comprises:

extracting first feature values from the first audio;

inputting the first feature values to an artificial neural network (ANN); and determining whether the wake-up word of the artificial intelligence robot device is recognized based on an output of the artificial neural network (ANN).

18. The machine-readable non-transitory medium of claim 17, wherein determining whether the location of the user is included in the set voice collection range comprises:
  extracting second feature values from information from a sensor related to the location of the user;
  inputting the second feature values to a second ANN to distinguish whether the location of the user is included in the set voice collection range; and
  determining whether the location of the user is included in the set voice collection range based on an output of the second ANN.

19. The machine-readable non-transitory medium of claim 18, wherein determining of the noise state of the first audio comprises:
  extracting third feature values of the noise from the first audio;
  inputting the third feature values of the noise to a third ANN to distinguish the noise state of the first audio; and
  determining the noise state of the first audio based on an output of the third ANN.

* * * * *